US005404157A

United States Patent [19]

Hosaka et al.

[11] Patent Number: 5,404,157

[45] Date of Patent: Apr. 4, 1995

[54] APPARATUS FOR GENERATING IONS IN SOLID ION RECORDING HEAD WITH IMPROVED STABILITY

[75] Inventors: Yasuo Hosaka, Tokyo; Hideyuki Nakao, Kanagawa; Hitoshi Nagato, Kanagawa; Shuzo Hirahara, Kanagawa; Yoshikuni Matsumura, Kanagawa; Yuzo Koike, Kanagawa; Teruki Oitome, Tokyo, all of Japan

[73] Assignee: Kabushiki Kaisha Toshiba, Kawasaki, Japan

[21] Appl. No.: 98,873

[22] Filed: Jul. 29, 1993

Related U.S. Application Data

[60] Division of Ser. No. 845,955, Mar. 4, 1992, Pat. No. 5,270,741, which is a continuation-in-part of Ser. No. 753,233, Aug. 30, 1991, Pat. No. 5,239,317.

[30] Foreign Application Priority Data

Feb. 20, 1991 [JP] Japan .................................. 3-109910
May 31, 1991 [JP] Japan .................................. 3-130081

[51] Int. Cl.[6] .............................................. G01D 15/06
[52] U.S. Cl. ..................................... 347/128; 395/108
[58] Field of Search .......................... 346/159; 395/108

[56] References Cited

U.S. PATENT DOCUMENTS 5,006,869 4/1991 Buchan et al. ...................... 346/159
5,170,188 12/1992 Bowers et al. ...................... 346/159

*Primary Examiner*—George H. Miller, Jr.
*Attorney, Agent, or Firm*—Oblon, Spivak, McClelland, Maier & Neustadt

[57] ABSTRACT

A solid ion recording head using an ion generation device, capable of realizing a uniform and stable recording and a compact physical configuration. The head includes a head support member in substantially rectangular cross sectional shape for supporting the ion generation device on a lower side of the rectangular cross sectional shape facing against the recording medium and the driving circuits on side faces of the rectangular cross sectional shape. The ion generation device includes control electrodes having ion passing holes which are arranged such that picture dot to be recorded on the recording medium from each one of the ion passing holes is recorded on a spot around which picture dots already recorded by other ion passing holes are distributed symmetrically on both sides. The control electrodes may have a structure in which a plurality of the ion passing holes are provided with respect to each picture dot to be recorded.

6 Claims, 31 Drawing Sheets

F I G. 42A
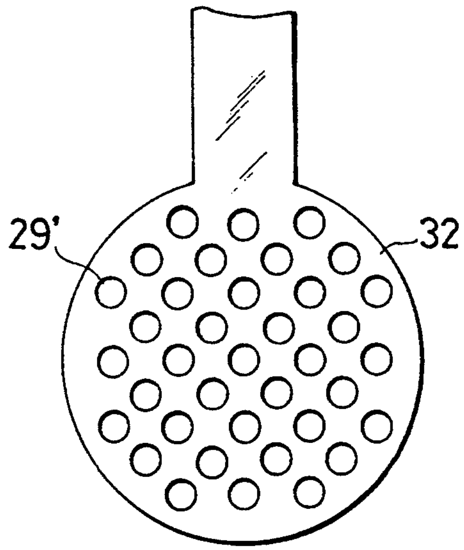
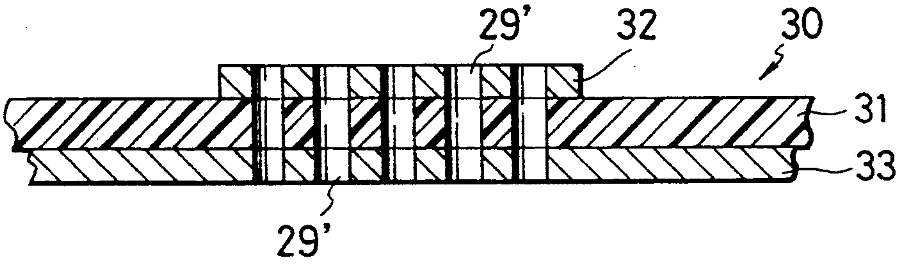
F I G. 42B

APPARATUS FOR GENERATING IONS IN SOLID ION RECORDING HEAD WITH IMPROVED STABILITY

This is a division of application Ser. No. 07/845,955, filed on Mar. 4, 1992, U.S. Pat. No. 5,270,741, which is a continuation-in-part of application Ser. No. 07/753,233, filed on Aug. 30, 1991, U.S. Pat. No. 5,239,317.

BACKGROUND OF THE INVENTION

Field of the Invention

The present invention relates to an electrostatic recording apparatus for carrying out an image recording by forming an electrostatic latent image on a dielectric recording medium and developing the formed electrostatic latent image, and more particularly, to an apparatus for generating ions in a solid ion recording head for forming the electrostatic latent image by using ion currents.

Description of the Background Art

As an ion recording head for forming an electrostatic latent image by using ion currents, one using a solid ion generator instead of a corona charger is known conventionally. Such a solid ion generator comprises an ion generation electrode and an induction electrode which are arranged on a dielectric substrate. In a solid ion recording head using such a solid ion generator, an acceleration electrode having ion outlet holes in correspondence with recording picture elements is placed in front of such a solid ion generator and a bias voltage as high as the electrostatic latent image contrast is applied to the solid ion generator in accordance with the recording signals, so as to control a flow of the ion currents for forming the electrostatic latent image on the dielectric recording medium.

In such a solid ion recording head using a solid ion generator, the high density ions can be generated and therefore the high speed recording faster than a laser printer becomes possible, as described in detail in "The 4th international congress on advances in non-impact printing technologies", sponsored by SPSE, p. 394.

As an example of a conventional solid ion recording head, that disclosed in Japanese Patent Application Laid Open No. 54-78134 and U.S. Pat. No. 4,160,257 is shown in FIG. 1.

This solid ion recording head of FIG. 1 comprises an induction electrode 902 provided on one side of a dielectric substrate 901, and an ion generation electrode 903 provided on the other side of the dielectric substrate 901. The ion generation electrode 903 has a slit (or hole) 904 for concentrating the electric field such that the ions can be generated easily. When the alternating voltage 905 is applied between the induction electrode 902 and the ion generation electrode 903, a strong alternating electric field is generated in the slit 904 and high density ions of positive and negative polarities are generated. Among the positive and negative ions so generated, only the ions of the positive polarity are selected out by a high bias voltage 906 of 1000 to 1600 V which is approximately equal to the electrostatic latent image voltage level applied to the ion generation electrode 903, and are subsequently transferred toward a dielectric recording medium 907. These ions transferring toward the dielectric recording medium 907 are then accelerated by a high acceleration voltage 909 of about 800 to 1200 V applied to an acceleration electrode 908 provided between the ion generation electrode 903 and the dielectric recording medium 907, and reach the dielectric recording medium 907 to form the electrostatic latent image according to the image signals. In this manner, the flow of the ion currents is controlled to be On and Off by using the bias voltage 906. The solid ion recording head has a number of recording head elements such as that shown in FIG. 1 arranged linearly in correspondence with a number of picture elements. Here, a corona charger used in a conventional electrophotography may be used instead of a solid ion generator.

However, such a conventional solid ion recording head has the following problems.

First, in the solid ion recording head, it is necessary to apply a voltage of 1000 to 1600 V which is as high as that of the electrostatic latent image voltage level on the dielectric recording medium 907 to the ion generation electrode 903 as a signal voltage in order to control the ion currents. More specifically, this is achieved by switching a switch 910 in accordance with the image signals and applying the bias voltage 906. As a result, in the electrostatic recording apparatus using such a solid ion recording head, it becomes necessary to use a driving IC of high withstand voltage. However, such a driving IC of high withstand voltage requires a large installation area such that it is not suitable for a high resolution head for which a high density installation is necessary. On the other hand, when the driving circuit is formed by using a driving IC of high withstand voltage and subdivided into matrix driven parts, it becomes difficult to carry out the gradation recording (multivalue recording) by using the pulse width control during the high speed recording and only the binary recording using On and Off control is possible.

Secondly, in the electrostatic recording apparatus using a conventional ion recording head, all the ions generated are transferred toward the dielectric recording medium 907. However, in this manner of recording, the amount of ion generation varies as the ion generation critical voltage changes depending on the surface state of the ion generation electrode 903, so that it has been difficult to form a uniform electrostatic latent image even in a case of a binary recording.

The Delfax Corporation of U.S.A. has developed a solid ion recording head in which the ion currents are On and Off controlled by switching the high frequency high voltage of about 3 $KV_{p-p}$ and 1 MHz to be applied to a solid ion generator for each picture element by using the signal voltages for each picture element, and the binary electrostatic latent image is formed on an insulative layer of the recording medium by using all the ions generated as the generated ions are accelerated by applying the high direct voltage of over 1 KV to a common acceleration electrode having ion outlet holes in correspondence with the picture elements. This solid ion recording head is capable of carrying out the high speed binary recording of up to 330 papers per minute for A4 size paper, and can be operated with only one maintenance operation for printing of a hundred thousand papers.

However, in general, the amount of ions generated by the solid ion generator is greatly affected by the environmental conditions, and because the above described solid ion recording head uses all the ions generated in forming the electrostatic latent image, so that there has been possibilities for the deterioration of the image quality as the amount of ions contributing to the electrostatic latent image varies depending on the environmental conditions. For this reason, the Delfax Corporation uses a crystalline mica for the dielectric substrate of the solid ion recording head because the crystalline mica remains stable for an extended period of time as it is not altered by the nitrate generated by the ion radiation and corona ion generation. This, however, gives rise to a problem that it is difficult to adapt this solid ion recording head to a mass production because of the difficulty in attaching the crystalline mica with a device substrate and forming electrodes on the crystalline mica by using a thick film printing technique.

Also, in such a solid ion recording head, it is necessary to have an accurate agreement between the size and the center of the ion generation hole of the solid ion generator and those of the ion outlet hole of the acceleration electrode for each picture element. When such an agreement is not achieved, the amount of ion generation can be varied, and the fluctuation in the amount of the ion generation determined by the accuracy of manufacturing technique can cause the concentration fluctuation on the recorded image.

Moreover, the solid ion recording head described above is capable of carrying out the high speed recording, but a special type of a driving circuit is necessary because the high frequency high voltage is used for each picture element, so that the size of the driving circuit becomes larger and it is difficult to form this driving circuit in a form of a driving IC.

There is a proposition for manufacturing the dielectric substrate with a material which can be adapted to a mass production by using the thick film printing technique, where the ion generation is stabilized by providing the dielectric substrate in a form of a double layer structure and heaters are used as the electrodes, and where the amount of ion generation can be appropriately controlled by adjusting the frequency of the alternating voltage. However, such a solid ion recording head is structurally equivalent to a capacitive load in which an amount of the alternating current increases when the frequency of the alternating voltage is increased. The power source of a high voltage, high frequency, and a large amount of current is quite expensive and can enlarge the size of the apparatus itself.

As a method of reducing the driving voltage for the ion recording head, there is a method disclosed in Japanese Patent Application Laid Open No. 61-255870 in which a control electric field is provided in a direction perpendicular to the ion current flow transported by a high speed air flow. By using this method, it becomes possible to reduce the driving voltage to be as low as about 30 V, as well as to carry out the multi-value recording, but a complicated electrode structure becomes necessary in order to provide the control electric field mentioned above, and therefore it is not suitable for the high density installation. Moreover, in this method, the speed of recording is determined by the speed of the air flow, and it is difficult to obtain a stable recording.

On the other hand, there is known a method in which a corona charger is used instead of the ion generator, the generated ion currents are pinched down by two control electrodes, and the flow of the ion currents is controlled by the signal voltages between two control electrodes. This method uses a relatively low control voltage of 120 V and is capable of obtaining a high contrast electrostatic latent image. In addition, a usual toner used in a general copy machine can be used for this method, and it is possible to carry out the analog gradation recording at the same quality as that can be obtained by a laser printer in which the gradation is achieved by the concentration of the picture elements, with the resolution lower than that of the laser printer.

However, there is a need to apply the high voltage for ion acceleration between the recording medium and the control electrodes so that it is necessary to bias the driving circuit by the high voltage.

Moreover, the amount of ions that can be generated by the corona charger is limited, so that the recording speed is accordingly limited to about 2 sheets/minute at best.

Furthermore, in this method, it is necessary to provide electrodes for pinching down the ion currents between the corona charger and the control electrodes, and there is a need for having an accurate agreement between the size and the center of the ion outlet hole of these electrodes and those of the ion outlet hole of the control electrodes. When such an agreement is not achieved, the amount of ion generation can be varied greatly, and the fluctuation in the amount of the ion generation determined by the accuracy of manufacturing technique can cause the concentration fluctuation on the recorded image.

In addition, this method uses the corona charger, so that it is difficult to solidify the ion recording head and therefore it is not suitable for the mass production.

Furthermore, the various conventional methods described so far have a problem that the ion recording head is polluted by the floating toner or the residual toner on the recording medium, such that the toner gets stuck in the ion outlet hole for the ion currents and obstructs the flow of the ion currents.

SUMMARY OF THE INVENTION

It is therefore an object of the present invention to provide an apparatus for generating ions in a solid ion recording head, capable of realizing a low voltage driving, a simple electrode structure, a high density installation, a multi-value recording, a uniform and stable electrostatic latent image formation, a compact size, and a mass production.

It is another object of the present invention to provide an apparatus for generating ions in a solid ion recording head, capable of reducing the capacitive load while maintaining a stable generation of high density ions.

It is another object of the present invention to provide a solid ion recording head incorporating the apparatus for generating ions according to the present invention, capable of realizing a compact physical configuration.

According to one aspect of the present invention there is provided an ion recording head apparatus, comprising: ion generation device means for controllably producing ions for forming an electrostatic latent image on a recording medium; driving circuit means for providing driving signals for causing a generation of ions in the ion generation device means and control signals for controlling a production of ions from the ion generation device means; and a head support member in substantially rectangular cross sectional shape for supporting the ion generation device means on a lower side of the rectangular cross sectional shape facing against the recording medium and the driving circuit means on side faces of the rectangular cross sectional shape.

According to another aspect of the present invention there is provided an apparatus for generating ions, comprising: ion generator means for generating ions; and control electrode means having ion passing holes for controlling a motion of the ions from the ion generator means to the recording medium through the ion passing holes, the ion passing holes being arranged such that a picture dot to be recorded on the recording medium from each one of the ion passing holes is recorded on a spot around which picture dots already recorded by other ion passing holes are distributed symmetrically on both sides.

According to another aspect of the present invention there is provided an apparatus for generating ions, comprising: ion generator means for generating ions; and control electrode means having ion passing holes for controlling a motion of the ions from the ion generator means to the recording medium through the ion passing holes, a plurality of the ion passing holes being provided on the control electrode means with respect to each picture dot to be recorded.

Other features and advantages of the present invention will become apparent from the following description taken in conjunction with the accompanying drawings.

BRIEF DESCRIPTION OF THE DRAWINGS

FIG. 42 is an illustration of a plan view and a cross sectional view of one modified embodiment of ion passing holes on a control substrate in the ion generation device according to the present invention.

DETAILED DESCRIPTION OF THE PREFERRED EMBODIMENTS

Figure 1:
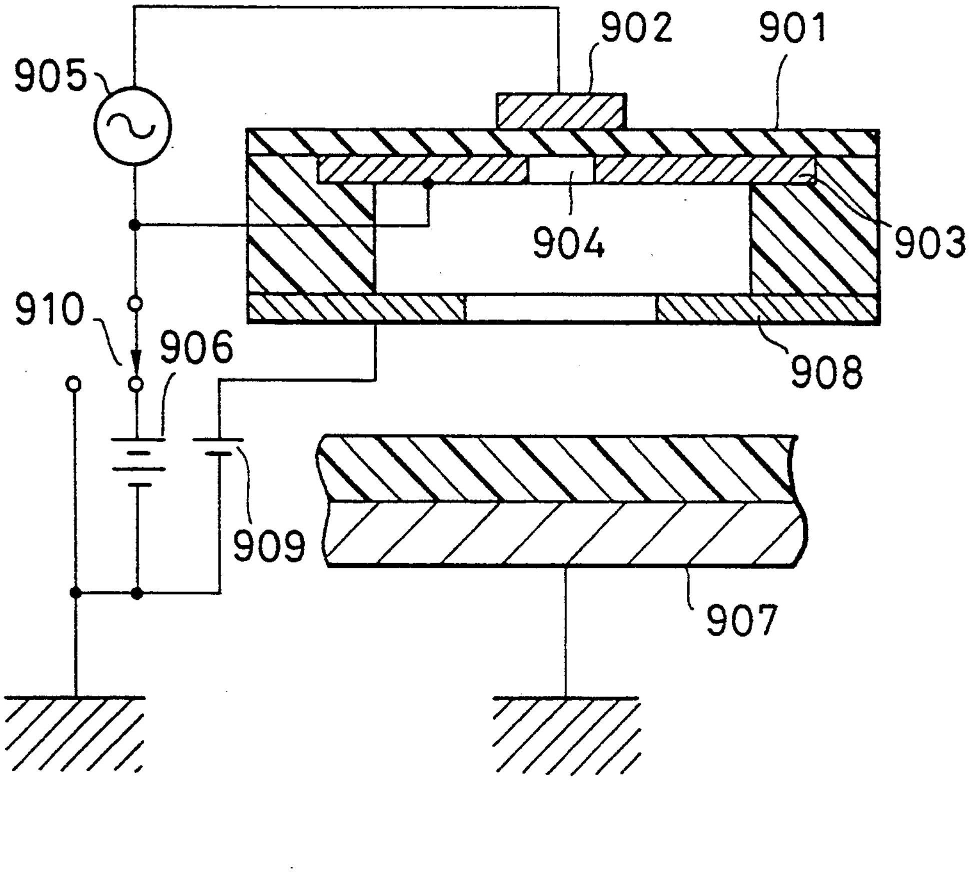
FIG.1 PRIOR ART
FIG. 1 is a schematic cross sectional view of one example of a conventional solid ion recording head.
Figure 2:
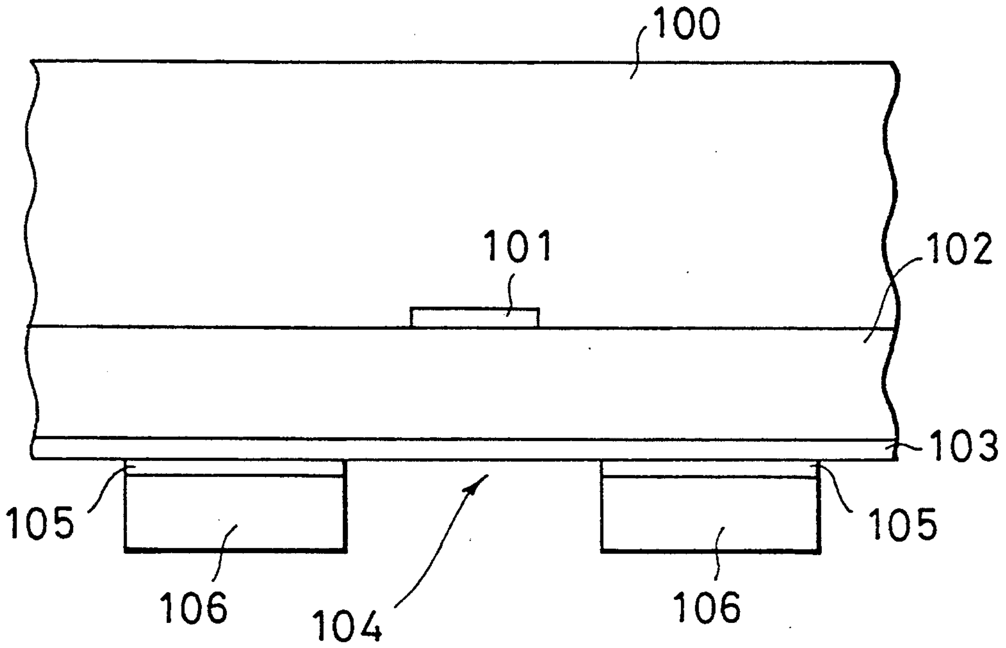
FIG. 2 is a cross sectional view of a first embodiment of an apparatus for generating ions in a solid ion recording head according to the present invention.

Referring now to FIG. 2, a first embodiment of an apparatus for generating ions in a solid ion recording head according to the present invention will be described in detail.

In this first embodiment, the apparatus for generating ions comprises: a ceramic substrate 100; an induction electrode 101 formed on a lower surface of the ceramic substrate 100; a glass dielectric layer 102 formed on the entire lower surface of the ceramic substrate 100 over the induction electrode 101; a polyimide insulation layer 103 formed over an entire lower surface of the glass dielectric layer 102; and ion generation electrodes 106 having a slit section 104 located below the induction electrode 101 on the polyimide insulation layer 103, which are attached to the polyimide insulation layer 103 through nickel adhesive layers 105.

More specifically, this apparatus for generating ions of FIG. 2 is constructed as follows. First, the induction electrode 101 made by a sintered metallic plate of 3–4 μm thickness and 40 μm width is formed on the ceramic substrate 100 of 640 μm thickness by using a thick film printing technique and a sintering technique. Then, on top of this induction electrode 101, the glass dielectric layer 102 of approximately 25 μm thickness is formed over the ceramic substrate 100 by using a thick film printing technique and a sintering technique. Then, on top of this glass dielectric layer 102, the polyimide insulation layer 103 of approximately 5 μm thickness is formed by using a spinner application technique. Next, at appropriate positions on this polyimide insulation layer 103, nickel adhesive layers 105 of few thousand Å thickness and 70 μm width each, which have a strong adherence with respect to the polyimide, are formed by using the thin film printing technique, with the slit section 104 having a width greater than that of the induction electrode 101 formed therebetween. Then, on these nickel adhesive layers 105, the ion generation electrodes 106, each of which is made by a layer of a not easily oxidizable metal such as gold or nickel, are formed by using a metal plating technique, for approximately 15 μm thickness required for the generation of the ions, with the slit section 104 having a width greater than that of the induction electrode 101 formed therebetween.

Here, the induction electrode 101 and the ion generation electrodes 106 are formed such that the slit section 104 has a width wider than that of the induction electrode 101, so that the induction electrode 101 and the ion generation electrodes 106 do not overlap in a vertical direction. With this configuration, the electrostatic capacity of the solid ion recording head can be reduced significantly, up to ⅓ of a conventional solid ion recording head. As a result, an alternating voltage necessary for driving this solid ion recording head can be provided by a relatively cheap alternating voltage source. Also, as a consequence, although the region of the electric field formed at the silt section 104 becomes smaller compared with a conventional solid ion recording head such that 1.25 times the voltage required by a conventional solid ion recording head is necessary for producing the electric field of the same size as that obtained by a conventional solid ion recording head, an amount of currents flowing through the solid ion recording head can be $1.25\times\frac{1}{3}=0.42$ times the amount of currents in the conventional solid ion recording head.

Moreover, the polyimide insulation layer 103 which has a rather low withstand voltage but is strong against the ion irradiations and has a large insulation resistance is provided over the lower surface of the glass dielectric layer 102 which is rather weak against the ion irradiations but has a high withstand voltage, so as to improve the strength of the solid ion recording head with respect to The damaging due to the irradiation of the ions generated in the slit section 104.

Furthermore, this apparatus for generating ions of FIG. 2 has an advantage of being capable of realizing a highly uniform generation of ions, for the following reason.

Namely, in generating ions, as $N_\phi$ electrons naturally present in the air due to the cosmic rays etc. pass through the air by being accelerated by the electric field E, the electron multiplying coefficient α is increased such that the number of electrons are multiplied and a large amount of electrons can be produced. After the electrons pass through the electric field E, as many ions as the additional electrons produced in the electric field E are generated behind. In order to multiply the number of electrons, it is necessary to provide a sufficient distance x for the electrons to travel through while colliding with the molecules in the air, and a sufficient electric field E to discharge the molecules in the air. The density of the additional electrons produced in the electric field E has the following relationships with respect to the distance x and electric field E.

$$n=N_\phi/\alpha\cdot\{\exp(\alpha\cdot x)-1\}$$

$$\alpha=p\cdot A\cdot\exp(-B\cdot p/E)$$

where A and B are empirically determined proportionality constants in the air, and p is an air pressure at a time of the ion generation.

Figure 3:
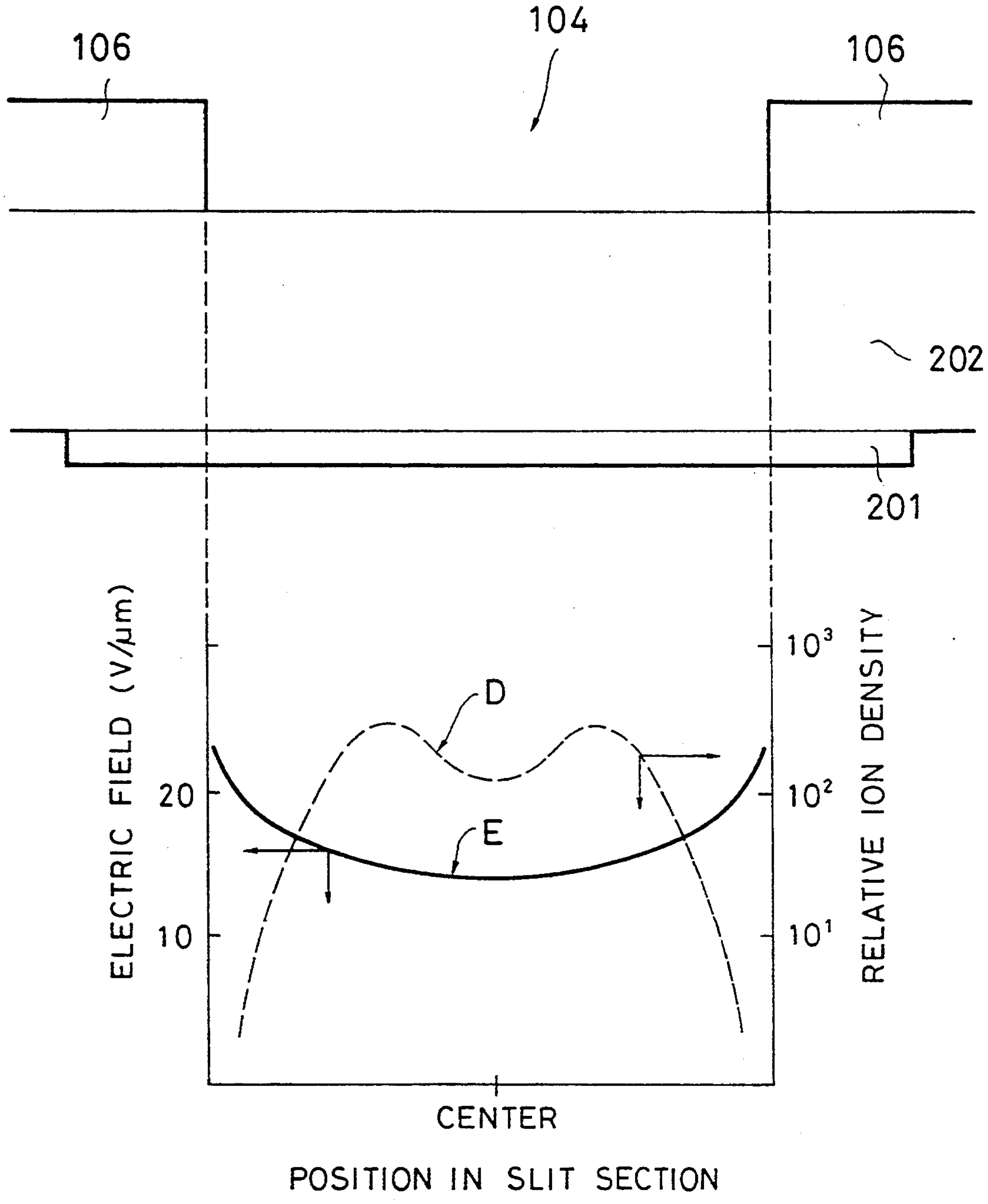
FIG. 3 is a cross sectional view of an exemplary model of an apparatus for generating ions in a solid ion recording head and a graph of the electric field and the generated electron density distribution calculated for this model.

From these relationships, as shown in FIG. 3, the electric field E and the ion density distribution D in a vicinity of a surface of a usual dielectric layer 202 in the slit section 104 can be calculated by using a boundary element method, for a case of applying 2.5 $kV_{p\text{-}p}$ alternating voltage to the ion generation electrodes 106 with respect to an induction electrode 201 which has a width larger than that of the slit section 104 with the dielectric layer 202 of 25 μm thickness, the slit section 104 of 100 μm width and the ion generation electrodes 106 of 15

$\mu$m thickness. As can be seen from FIG. 3, the electric field E is large at a Junction between the ion generation electrodes 106 and the dielectric layer 202, but the travelling distance is short so that the density of the produced electrons is small. Also, the electron multiplying coefficient a takes the largest value around the center of the slit section 104, so that the amount of ions generated becomes maximum around the center of the slit section 104. In other words, the strong electric field in a vicinity of a junction between the ion generation electrodes 106 and the dielectric layer 202 hardly contributes to the generation of ions, but rather contributes to the damaging of the induction electrode 201 due to the irradiation of the ions and electrons generated in the slit section 104.

On a basis of this calculation, the induction electrode 101 is formed to have a width smaller than that of the slit section 104 such that the electric field in a vicinity of the ion generation electrodes 106 is weak. As a result, the deterioration of the the surface resistance of the dielectric layer 202 due to the irradiation of the generated ions can be prevented.

Thus, although this configuration of the first embodiment removes a region of the maximum electric field strength between the ion generation electrodes 106, the stable and quite uniform generation of sufficiently high density ions can be realized.

It is to be noted that the insulation layer 103 of this first embodiment may be made from any one of silicon dioxide ($SiO_2$), ditantalum pentoxide ($Ta_2O_5$), trisilicon tetranitride ($Si_3N_4$), and a mixture of oxide and nitride, instead of polyimide as described above.

Figure 4:
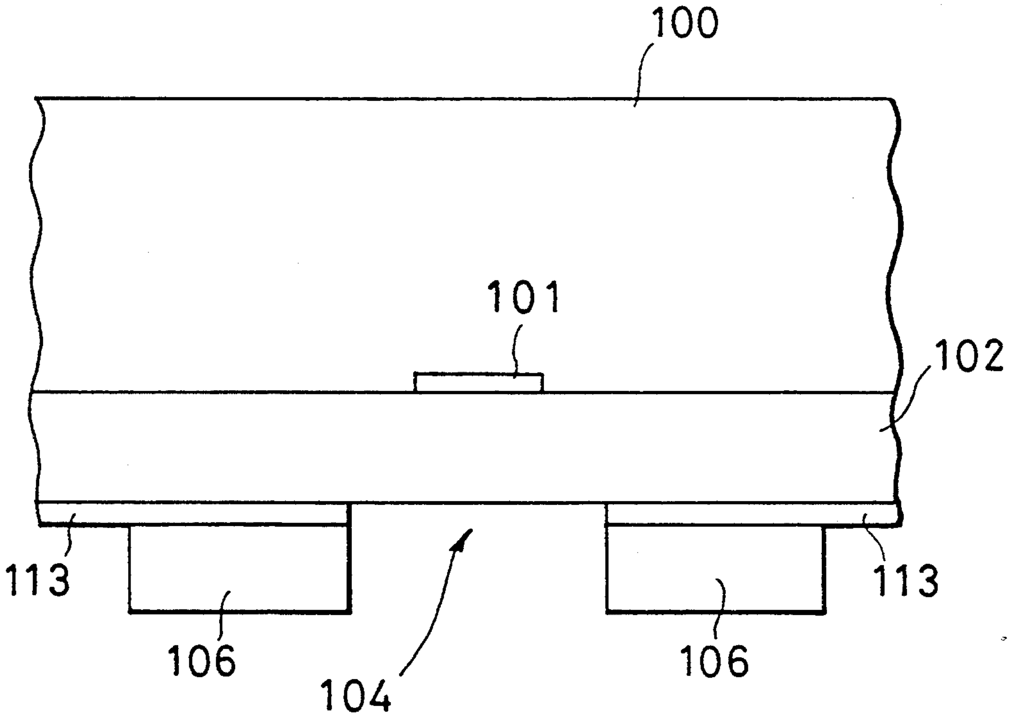
FIG. 4 is a cross sectional view of a second embodiment of an apparatus for generating ions in a solid ion recording head according to the present invention.

Referring now to FIG. 4, a second embodiment of an apparatus for generating ions in a solid ion recording head according to the present invention will be described in detail. Here, those elements which are substantially equivalent to the corresponding elements in the first embodiment described above will be given the same reference numerals in the figure and their description will be omitted.

In this second embodiment, the apparatus for generating ions differs from that of the first embodiment described above in that the polyimide layer 103 in the first embodiment is replaced by two polyimide insulation layers 113 formed on the lower surface of the glass dielectric layer 102 with a slit section 104 located below the induction electrode 101 formed therebetween, on which the ion generation electrodes 106 having the slit section 104 located below the induction electrode 101 are formed directly. Here, again, the induction electrode 101, polyimide insulation layers 113, and the ion generation electrodes 106 are formed such that the slit section 104 has a width wider than that of the induction electrode 101, so that the induction electrode 101 and the ion generation electrodes 106 do not overlap in a vertical direction.

More specifically, this apparatus for generating ions of FIG. 4 is constructed as follows. First, the induction electrode 101 made by a sintered metallic plate of 3–4 $\mu$m thickness and 40 $\mu$m width is formed on a ceramic substrate 100 of 640 $\mu$m thickness by using a thick film printing technique and a sintering technique. Then, on top of this ceramic substrate 100, the glass dielectric layer 102 of approximately 25 $\mu$m thickness is formed by using a thick film printing technique and a sintering technique. Next, a polyimide insulation layer 113 of approximately 5 $\mu$m thickness is formed uniformly over the glass dielectric layer 102 by using a spinner application technique, and a part of this polyimide insulation layer 113 located at a position of the slit section 104 is removed by using an etching technique, so as to leave the polyimide insulation layers 113 sandwiching the slit section 104. Then, the ion generation electrodes 106 are formed on the polyimide insulation layers 113 by using a thick film printing technique for approximately 15 $\mu$m thickness required for the generation of the ions, with the slit section 104 having a width greater than that of the induction electrode 101 formed therebetween.

This configuration for the second embodiment of FIG. 4 has a stronger adherence between each adjacent layer than the configuration for the first embodiment of FIG. 2 described above.

Besides that, all the advantages of the first embodiment described above are also pertinent to this second embodiment.

It is to be noted that the insulation layers 113 of this second embodiment may be made from any one of silicon dioxide ($SiO_2$), ditantalum pentoxide ($Ta_2O_5$), trisilicon tetranitride ($Si_3N_4$), and a mixture of oxide and nitride, instead of polyimide as described above.

Now, in the apparatus for generating ions in a solid ion recording head of the first and second embodiments described above, the surface resistance of the dielectric layer 102 may be reduced by the irradiation of the ions and electrons generated in the slit section 104 onto the dielectric layer 102.

Figure 5:
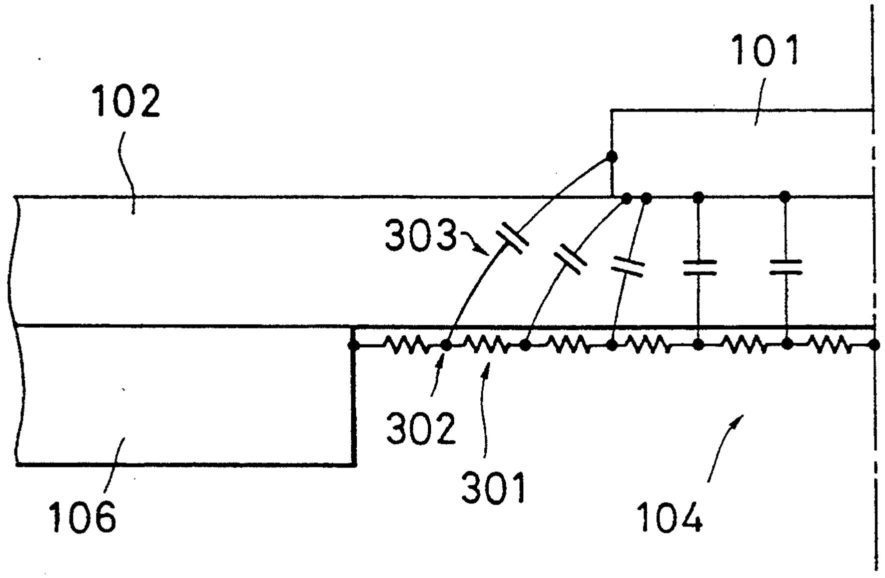
FIG. 5 is an enlarged cross sectional view of a part of an apparatus for generating ions in a solid ion resistance of a dielectric layer due to the irradiation of the ions and electrons.

As shown in FIG. 5, when the alternating voltage for the ion generation is applied between the induction electrode 101 and the ion generation electrodes 106 while the dielectric layer 102 has a reduced surface resistance 301, then the voltage level at a point 302 located some distance away from the ion generation electrodes 106 on the surface of the dielectric layer 102 becomes the same level as the ion generation electrodes 106 as the electrostatic capacities 303 of the dielectric layer 102 are charged sequentially from those located nearby the ion generation electrodes 106. As a result, the electric field cannot be formed in the slit section 104 between the ion generation electrodes 106 and the dielectric layer 102, and the ion generation becomes impossible.

Here, because the electric field formed in the slit section 104 is strongest in an immediate vicinity of the ion generation electrodes 106 as already described above, the reduction of the surface resistance 301 of the dielectric layer 102 progresses from the immediate vicinity of the ion generation electrodes 106. On the other hand, the ions are generated primarily at a middle portion of the slit section 104 as already described above, so that it is necessary to avoid the reduction of the surface resistance 302 of the dielectric layer 102 in a vicinity of this middle portion of the slit section 104, in order to secure the stable generation of high density ions.

This is achieved by a third embodiment of an apparatus for generating ions in a solid ion recording head according so the present invention shown in FIG. 6, which will now be described in detail. Here, again, those elements which are substantially equivalent to the corresponding elements in the first embodiment described above will be given the same reference numerals in the figure and their description will be omitted.

In this third embodiment, the induction electrode 101 and the ion generation electrodes 106 are formed on opposite sides of a dielectric layer 402 such that the slit section 104 has a width wider than that of the induction electrode 101, so that the induction electrode 101 and the ion generation electrodes 106 do not overlap in a vertical direction, as in the first embodiment described above.

The dielectric layer 402 has an indented portion 404 of a thickness smaller than the other portions of the dielectric layer 402, which is located over the middle portion of the slit section 104 directly below the induction electrode 101. Two edges of this indented portion 404 are made into slopes 406 having such an angle of inclination with respect to the horizontal plane that the electric field E formed in the slit section 104 runs substantially parallel to the slopes 406.

More specifically, in this third embodiment, each of the ion generation electrodes 106 has 15 μm thickness and the slit section 104 has a width 80 μm, while the dielectric layer 402 has a thickness equal to 25 μm at the indented portion and 30 μm at the other portions and the slopes 406 have the angle of inclination with respect to the horizontal plane equal to 65° to 70°.

With this configuration, the electric field E formed in the slit section 104 runs substantially parallel to the slopes 406 so that the slopes 406 are unaffected by the irradiation of the ions and electrons generated and therefore the slopes 406 can maintain the constant surface resistance. Consequently, when the alternating voltage for the ion generation is applied, the charging of the electrostatic capacities 303 of the dielectric layer 402 stops at the slopes 406 and therefore the reduction of the surface resistance at the indented portion 404 located in a vicinity of the middle portion of the slit section 104 can be prevented.

Thus, in this third embodiment, the stable generation of high density ions can be secured by providing the slopes 406 which runs substantially parallel to the electric field E in the slit section 104. By this third embodiment, it becomes possible to extend the period for generating sufficient amount of ions from 20 hours to over 100 hours.

It is to be noted that the configuration of the third embodiment described above can also be obtained as shown in FIG. 7 by using two dielectric layers 412 and 422 made by different materials instead of the dielectric layer 402 which is formed as a continuous layer made by a single material. Here, the first dielectric layer 412 on which the induction electrode 101 is formed has a uniform thickness, while the second dielectric layer 422 on which the ion generation electrodes 106 are divided into two sections having the slopes 406 formed on their ends, such that the indented portion 404 is formed between the slopes 406.

Figure 6:
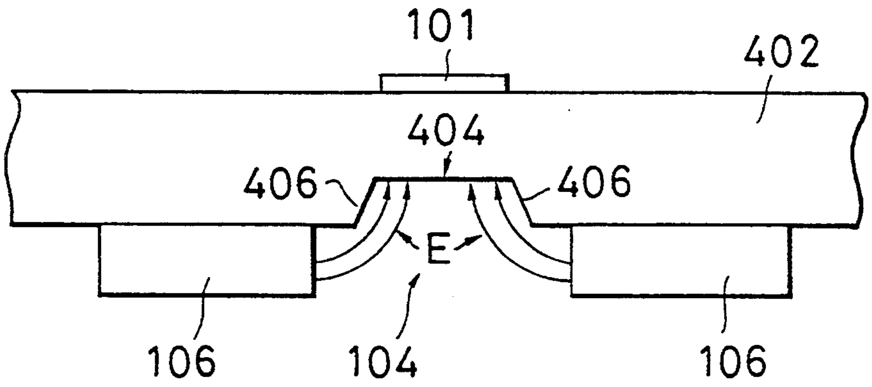
FIG. 6 is a cross sectional view of a third embodiment of an apparatus for generating ions in a solid ion recording head according to the present invention.
Figure 7:
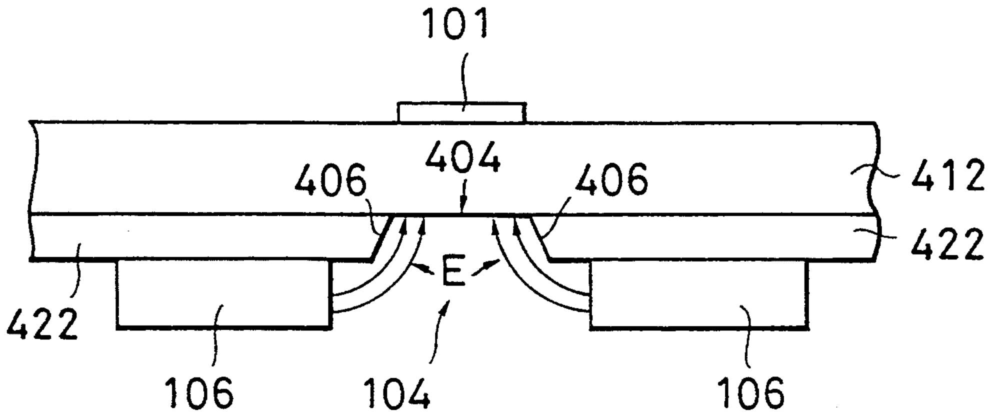
FIG. 7 is a cross sectional view of an alternative configuration for the third embodiment of an apparatus for generating ions in a solid ion recording head according to the present invention.
Figure 8:
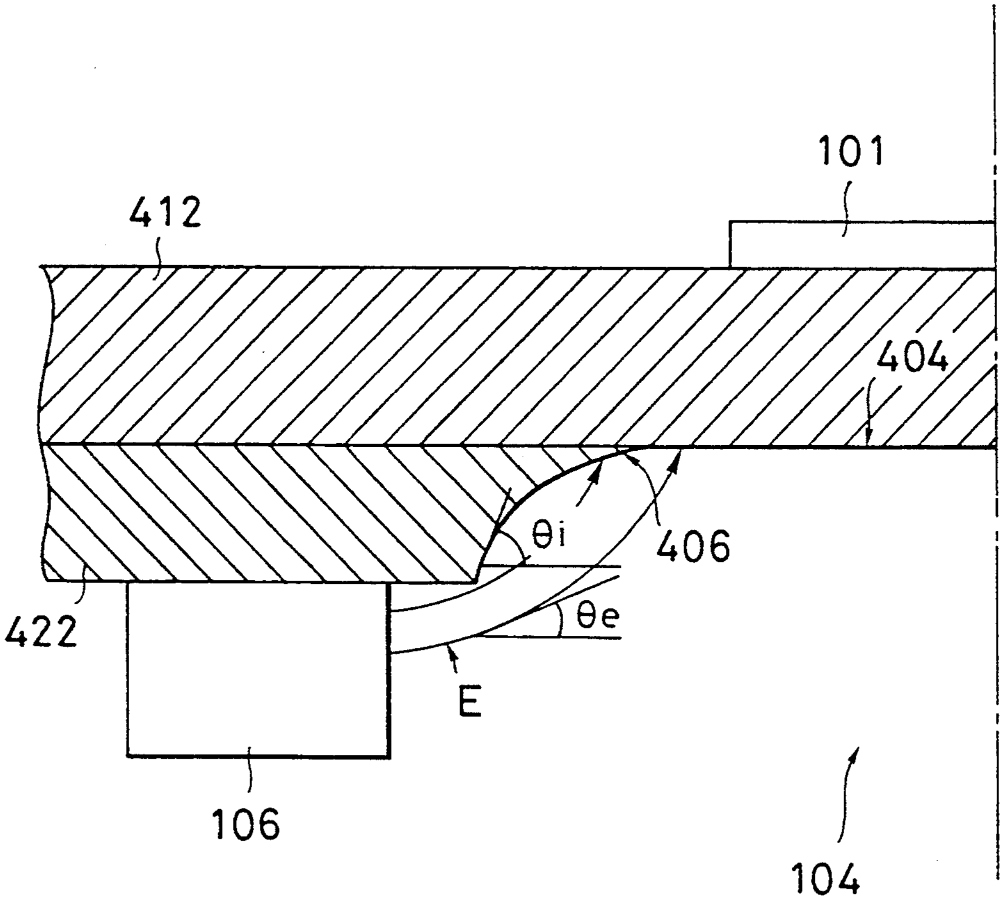
FIG. 8 is an enlarged cross sectional view of a part of the third embodiment of an apparatus for generating ions in a solid ion recording head of FIGS. 6 and 7.

It is also to be noted that, in forming the indented portion 404 by using the thick film printing technique, it is practically rather difficult to form the slopes 406 in forms of flat surfaces as shown in FIGS. 6 and 7. Thus, in practice, the slopes 406 may be formed in forms of curved surfaces as shown in FIG. 8. Even with such slopes 406 in forms of curved surfaces, the presence of a region which runs substantially parallel to the electric field in the slit section 104 on the slopes 406 can prevent the reduction of the surface resistance at the indented portion 404 located in a vicinity of the middle portion of the slit section 104, so that the stable generation of high density ions can be secured.

Here, it should be taken into account that the impact due to the electrons is more damaging to the dielectric layer than the impact due to the ions, and the impact due to the electrons can be avoided effectively by making the angle of inclination $\theta t$ of the slope 406 to be greater than the angle $\theta e$ of the electric field E.

It is further to be noted that the similar effect of securing the stable generation of high density ions can also be obtained to some extent by providing vertical edges between the ion generation electrodes 106 and the dielectric layer 102 as done by the polyimide insulation layers 103 in the second embodiment of FIG. 4 described above, although the effect is limited compared with this third embodiment.

Figure 13:
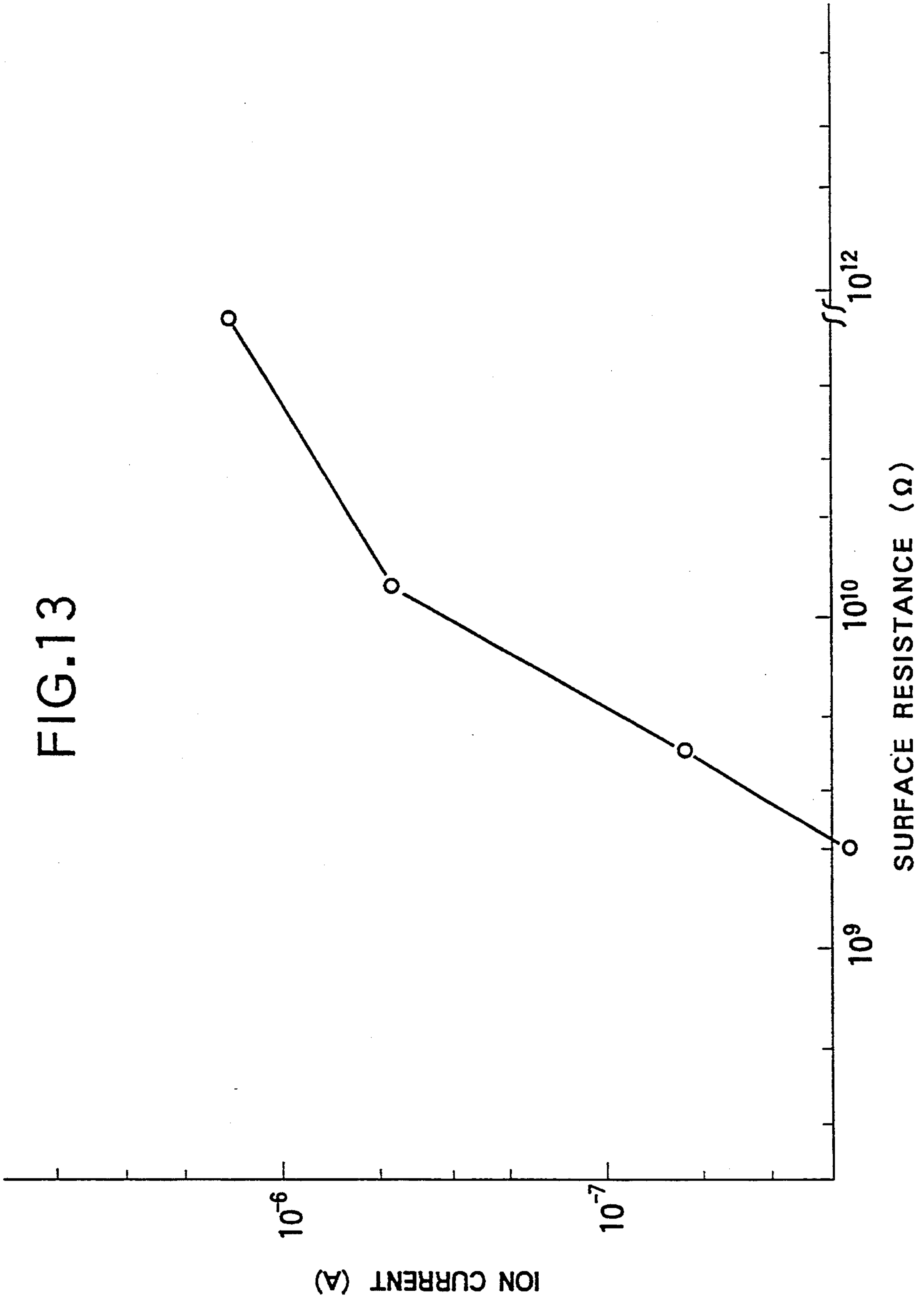
FIG. 13 is a graph showing a limit of deterioration for the surface resistance of the dielectric substrate.

In addition, the use of the material having the surface resistance over $10^9\ \Omega$ for the dielectric layer also has some effect of securing the stable generation of high density ions. This is because as shown in FIG. 13, the ion current generated from the ion generator can be reduced significantly for the surface resistance below $10^9\ \Omega$.

Figure 9:
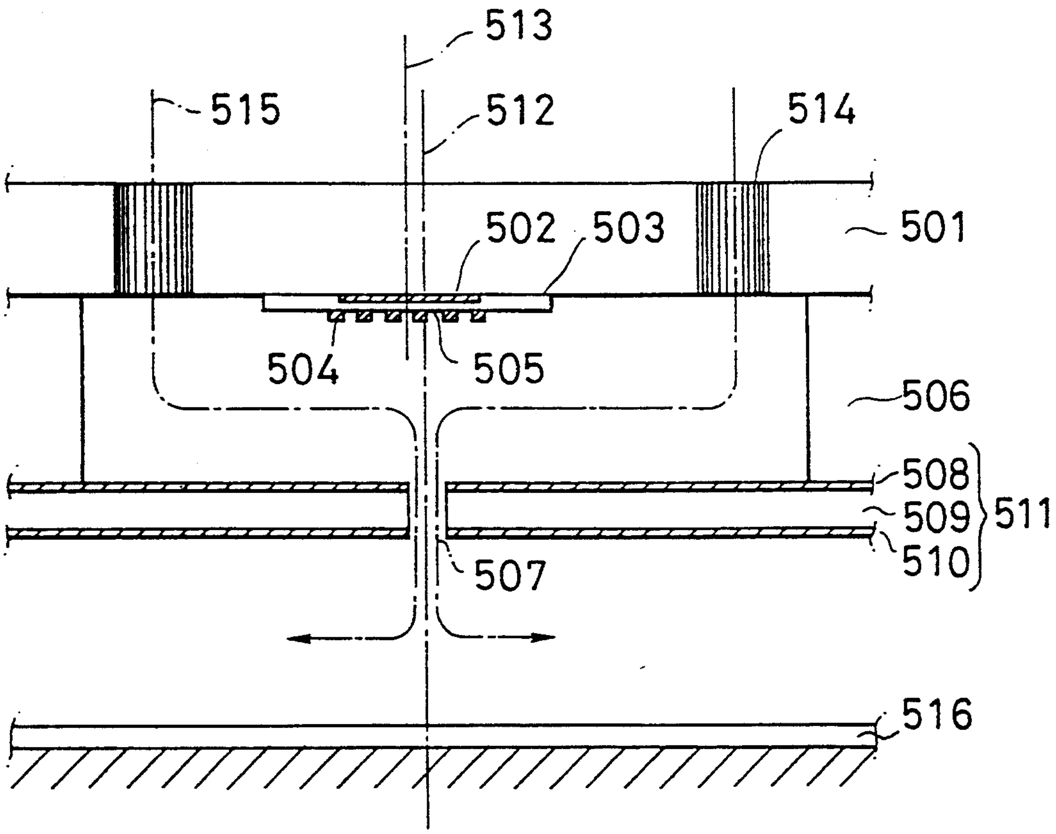
FIG. 9 is a cross sectional view of a fourth embodiment of an apparatus for generating ions in a solid ion recording head according to the present invention.

Referring now to FIG. 9, a fourth embodiment of an apparatus for generating ions in a solid ion recording head according to the present invention will be described.

In this fourth embodiment, the apparatus for generating ions comprises: a ceramic substrate 501 having air inlet holes 514; an induction electrode 502 formed on a lower surface of the ceramic substrate 501; a glass dielectric layer 503 formed on the entire lower surface of the ceramic substrate 501 over the induction electrode 502; a plurality of ion generation electrodes 504 arranged on the lower surface of the glass dielectric layer 503 at a constant interval such that a slit 505 is formed between neighboring ones of the ion generation electrodes 504; and a control electrode 511 having ion passing hole 507 below the ion generation electrodes 504, which is separated from the ceramic substrate 501 by insulation spacer layers 506 where the insulation spacer layers 506 substantially enclose the space between the ceramic substrate 501 and the control electrode 511, and which includes a pair of first and second control electrodes 508 and 510 sandwiching an insulation layer 509.

More specifically, this apparatus for generating ions of FIG. 9 is constructed as follows. First, the air inlet holes 514 of 1 mm diameter each are formed on the ceramic substrate 501 at 2 mm interval by using a laser manufacturing technique. Then, the induction electrode 502 of few μm thickness is formed on the ceramic substrate 501 between the air inlet holes 514 by using a thick film or thin film printing technique. Then, on top of this induction electrode 502, the glass dielectric layer 503 of approximately 20 μm thickness is formed over the ceramic substrate 501 by using a thick film printing technique. Then, on top of this glass dielectric layer 503, a plurality of the ion generation electrodes 504, each of which is made by a layer of metal having approximately 20 μm thickness and 40 μm width, are formed by using a thick film printing technique, at a constant interval of approximately 40 μm. Then, the insulation spacer layers 506 made of Mylar (registered trade mark of Du Pont) sheet of approximately 400 μm thickness each are formed on the ceramic substrate 501 outside a region between the air inlet holes 514. Then, the control electrode 511 formed by the first and second control electrodes 508 and 510, each of which has approximately 20 μm thickness, which are sandwiching the insulation layer 509, is formed on the insulation spacer layers 506, with the ion passing hole 507 located below the center of the ion generation electrodes 504.

Here, the width of the induction electrode 502 is made smaller than that of the ion generation electrodes 504 as a whole, so as to prevent the generation of unnecessary ions due to the electric field leaked from the induction electrode 502.

Also, the thickness of the first and second control electrodes 508 and 510 is selected such that the electric field at a middle of the ion passing hole 507 can be controlled by the low signal voltage to be applied between the first and second control electrodes 508 and 510.

Moreover, the insulation layer 509 separating the first and second control electrodes 508 and 510 has a thickness greater than the width of the slit 505 between neighboring ones of the ion generation electrodes 504 which in this case is equal to 40 μm.

Furthermore, the width of the slit 505 between neighboring ones of the ion generation electrodes 504 is smaller than a diameter of the ion passing hole 507.

With this configuration, as the width of the slit 505 between neighboring ones of the ion generation electrodes 504 is smaller than a separation distance between the first and second control electrodes 508 and 510, the electric field in a vicinity of the control electrode 511 is substantially uniform, so that the ions generated at the slits 505 between the ion generation electrodes 504 reaches to the control electrode 511 uniformly. Consequently, in this fourth embodiment, there is no need to carefully align a central axis 512 of the ion passing hole 507 and a central axis 518 of the ion generation electrodes 504 as a whole, and it suffices for the control electrode 511 to have the ion passing hole 507 at somewhere below the ion generation electrodes 504. As a result, the accuracy required in manufacturing this solid ion recording head can be not so stringent, so that the manufacturing process can be greatly simplified.

Furthermore, in this fourth embodiment, the air having a positive pressure is made to flow along arrows 515 from the air inlet holes 514, through a space enclosed by the ceramic substrate 501, insulation spacer layers 506 and the control electrode 511, to the ion passing hole 507, so as to keep a pressure inside a space between the control electrode 511 and an insulation body 516 of a recording drum to be higher. As a result, the attaching of the floating toner in this space to the ion passing hole 507 can be prevented and the stability of the ion generation operation of this apparatus for generating ions in a solid ion recording head can be improved.

Figure 10:
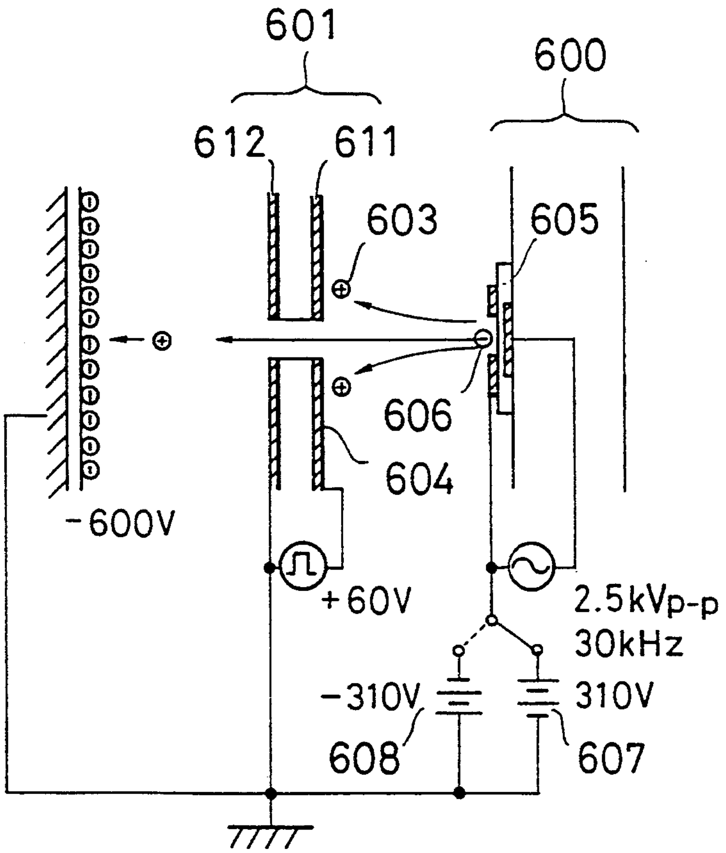
FIG. 10 is a cross sectional view of an exemplary model of a solid ion recording head for explaining a method of stably operating the solid ion recording head according to the present invention.

Referring now to FIG. 10, a method of stably operating a solid ion recording head according to the present invention will be described.

FIG. 10 shows a general configuration of a solid ion recording head in which the flow of the ions of positive polarity generated by a solid ion generator unit 600 is controlled by a control electrode unit 601 by using a low signal voltage applied between first and second control electrodes 611 and 612.

In this solid ion recording head, a surface of the first control electrode 611 is irradiated by a large amount of the positive ions 603 generated at the solid ion generator unit 600, so that the surface of this first control electrode 611 is oxidized to have an insulative layer 604 formed thereon. As a result, the charges are complied on this insulative layer 604 by the positive ions 603 reaching from the solid ion generator unit 600 to the control electrode unit 601, such that the bias voltage applied to the solid ion generator unit 600 is effectively lowered, which in turn causes a reduction of the ion currents. Especially when the signal voltage to be applied to the control electrodes 611 and 612 is in off state, all the positive ions 603 flows toward the first control electrode 611, so that if this first control electrode 611 is made from a metal such as a copper, this first control electrode 611 would be oxidized very quickly.

Such an oxidization of the first control electrode 611 and the formation of the insulative layer 604 on the first control electrode 611 can be prevented by forming this first control electrode 611 from a not easily oxidizable metal such as nickel, titanium, stainless steel, or gold, or from a metal such as an aluminum for which an oxidized surface layer can function as a protection layer for preventing further oxidization of an interior region, or else by covering the surface of the first control electrode 611 with a protection layer using a metal plating technique.

Moreover, the oxidized nitrogen ions can be generated from the ions generated by a solid ion generator unit 600, and the nitric acids can be generated from the oxidized nitrogen ions and the moisture in the air, which can affect the first control electrode 611 easily. Thus, in order to prevent this affection due to the nitric acids, it is also preferable to make the first control electrode 611 from a metal which is not easily affected by the nitric acids.

On the other hand, the negative ions 606 not used for the electrostatic latent image formation are complied on a surface of an insulation layer 605 of the solid ion generator unit 600, such that the bias voltage applied to the solid ion generator unit 600 is effectively lowered, which in turn causes a reduction of the ion currents. For this reason, there is a need to remove the negative ions 606 compiling on the insulation layer 605 of the solid ion generator unit 600.

This removal of the negative ions 606 from the insulation layer 605 can be achieved by applying a negative bias voltage 608 to the solid ion generator unit 600 while the signal voltage is in an off state, as opposed to a positive bias voltage 607 to be applied to the solid ion generator unit 600 while the signal voltage is in an on state.

Figure 11:
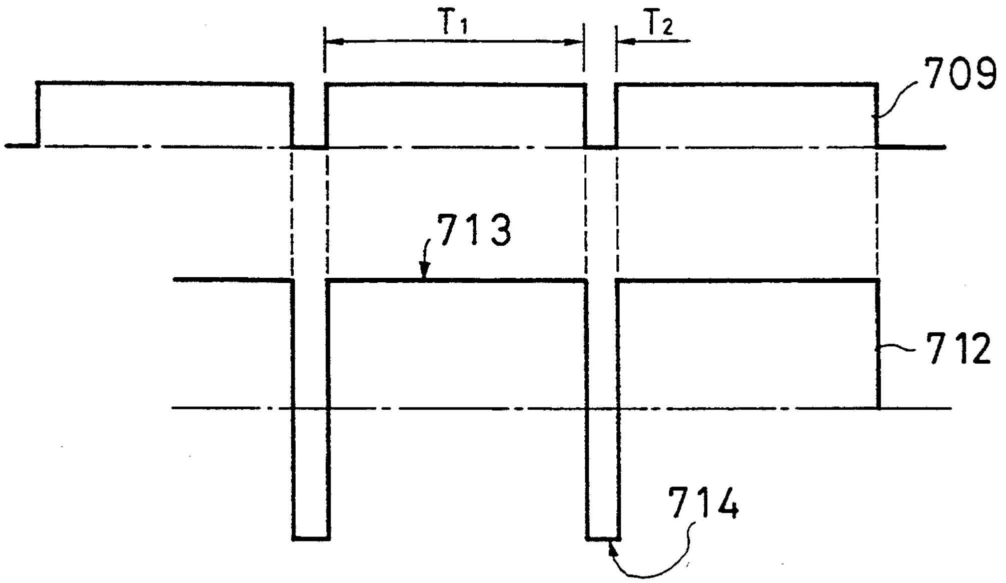
FIG. 11 is a timing chart for explaining a control of a bias voltage in the method of stably operating the solid ion recording head according to the present invention.

More specifically, the bias voltage to be applied to the solid ion generator unit 600 is controlled as shown in FIG. 11.

Namely, the bias voltage is controlled in accordance with a timing pulse 709 indicating timings for consecutively forming electrostatic latent images for a number of recording papers on a recording medium. In this timing pulse 709, a formation period T1 is a period for forming the electrostatic latent image for a single recording paper, which is followed by a pause period T2 before the next formation period starts.

The bias voltage is controlled by a bias pulse 712 synchronized with the timing pulse 709. Here, during the formation period T1, the bias pulse 712 is at a positive level 713 indicating the application of the positive bias voltage 607 while the signal voltage is in on state. On the other hand, during the pause period T2, the bias pulse 712 is at a negative level 714 indicating the application of the negative bias voltage 608 while the signal voltage is in an off state. Thus, the negative ions 606 compiled on the insulation layer 605 can be removed after every formation of the electrostatic latent image for a single recording paper.

Figure 12:
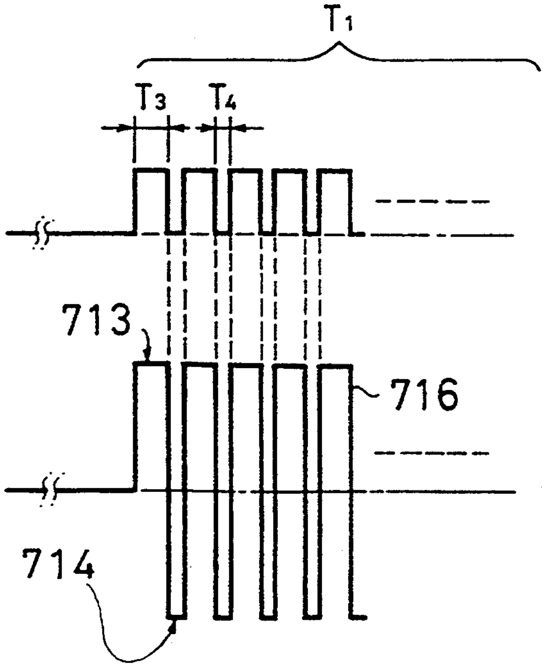
FIG. 12 is a timing chart for explaining an alternative control of a bias voltage in the method of stably operating the solid ion recording head according to the present invention.

Alternatively, the bias voltage to be applied to the solid ion generator unit 600 can be controlled as shown in FIG. 12.

Namely, each formation period T1 of the timing pulse 709 in FIG. 11 actually comprises a number of sub scanning periods T8 during which a plurality of solid ion recording heads are operated in parallel, each of which is followed by a brief sub pause period T4. Accordingly, the bias voltage can be controlled by a bias pulse 716 such that during the sub scanning period T3, the bias pulse 716 is at a positive level 713 indicating the application of the positive bias voltage 607, whereas during the sub pause period T4, the bias pulse 716 is at a negative level 714 indicating the application of the negative bias voltage 608. Thus, the negative ions 606 compiled on the insulation layer 605 can be removed after every sub scanning by the solid ion recording heads.

Figure 14:
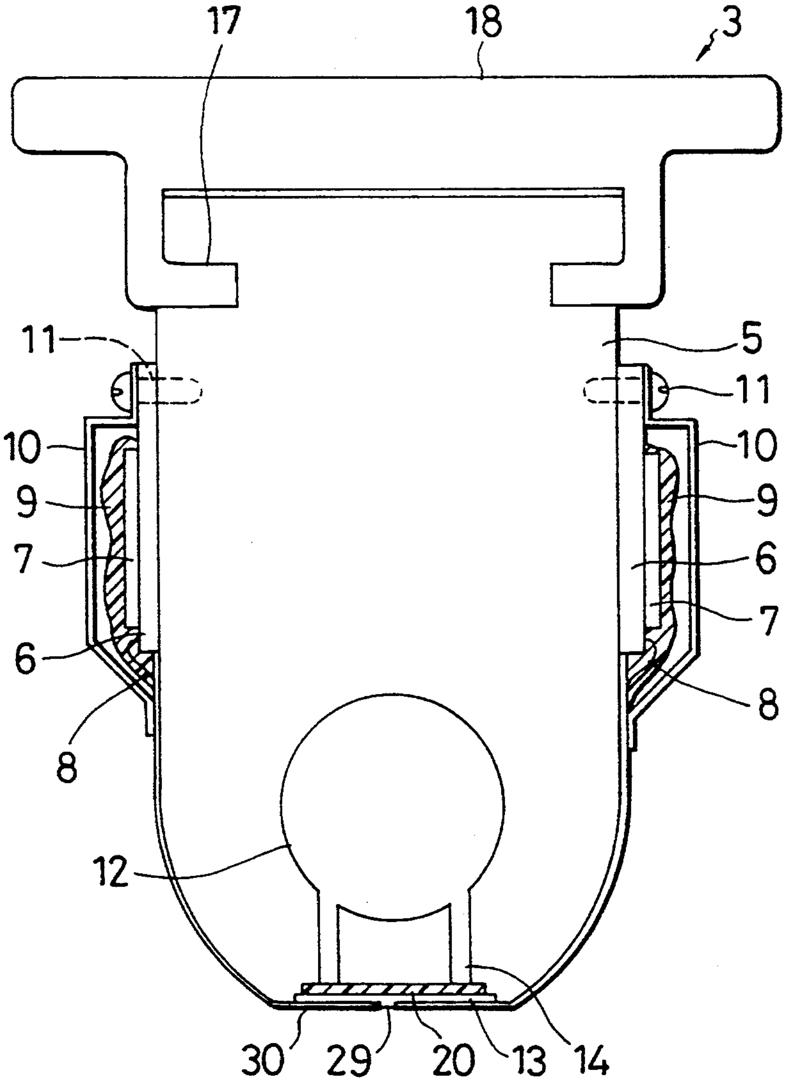
FIG. 14 is a longitudinal cross sectional view of an overall configuration of one embodiment of a solid ion recording head according to the present invention.

Referring now to FIG. 14, a first embodiment of a solid ion recording head using the apparatus for generating ions according to the present invention will be described in detail.

In this embodiment, the solid ion recording head 3 shown in FIG. 14 generally comprises a head support member 5, an ion generator 20, a control substrate 30 having ion passing holes 29 located below the ion generator 20, and driving circuit substrates 6. As shown in FIG. 14, the head support member 5 has an approximately rectangular cross sectional shape with a tapering lower side at a lower end on which the ion generator 20 and the control substrate 30 are arranged, while the driving circuit substrates 6 are provided on side faces of the head support member 5.

Here, the ion generator 20 and the control substrate 30 form an ion generation device configuration such as that described above in conjunction with FIG. 10, where the ion generator 20 corresponds to the solid ion generator unit 600 of FIG. 10 and the control substrate 30 corresponds to the control electrode unit 601 of FIG. 10, while the driving circuits for providing the driving voltages to this ion generation apparatus are formed on the driving circuit substrates 6.

Each one of the driving circuit substrates 6 has a number of driver ICs 7 mounted thereon, and is fixed on the side face of the head support member 5 by using adhesives. The control signal lines extending from the driver ICs 7 on the driving circuit substrate 6 are connected to a first control electrode (not shown in FIG. 14) of the control substrate 30 by a wire bonding 8, where the driver ICs 7 and the wire bonding 8 are covered by a resin mold 9 for insulation and an entire driving circuit substrate 6 is contained within a metal cover 10 attached to the head support member 5 by a screw 11. This protection of the driving circuit substrate 6 by the metal cover 10 is provided in order for preventing the malfunction of the driver ICs 7 due to the high frequency noises due to the very close location of the driving circuit substrate 6 to the high AC voltages at the ion generator 20. For this reason, it is preferable to maintain the metal cover 10 at the ground voltage level.

In this embodiment, each of the driver ICs 7 need to supply only few μA of current per dot, so that it is sufficient to have a much smaller current capacity for the same voltage endurance compared to the driving IC used in a conventional thermal head printer, such that the driver ICs 7 can have a much smaller chip area and can be made from highly integrated IC circuits capable of driving as many bits as 128 bits.

The head support member 5 also has an air supply port 12 formed above the ion generator 20 from which compressed air is supplied to a space 13 of 50 μm to 500 μm thickness formed between the ion generator 20 and the control substrate 30 through air supply passages 14, Just as in the fourth embodiment of FIG. 9 described above. This injection of the compressed air from the air supply port 12 has functions of stabilizing the ion generation at the ion generator 20 and of clearing of the toner entering into the ion passing holes 29 on the control substrate 30.

Figure 15:
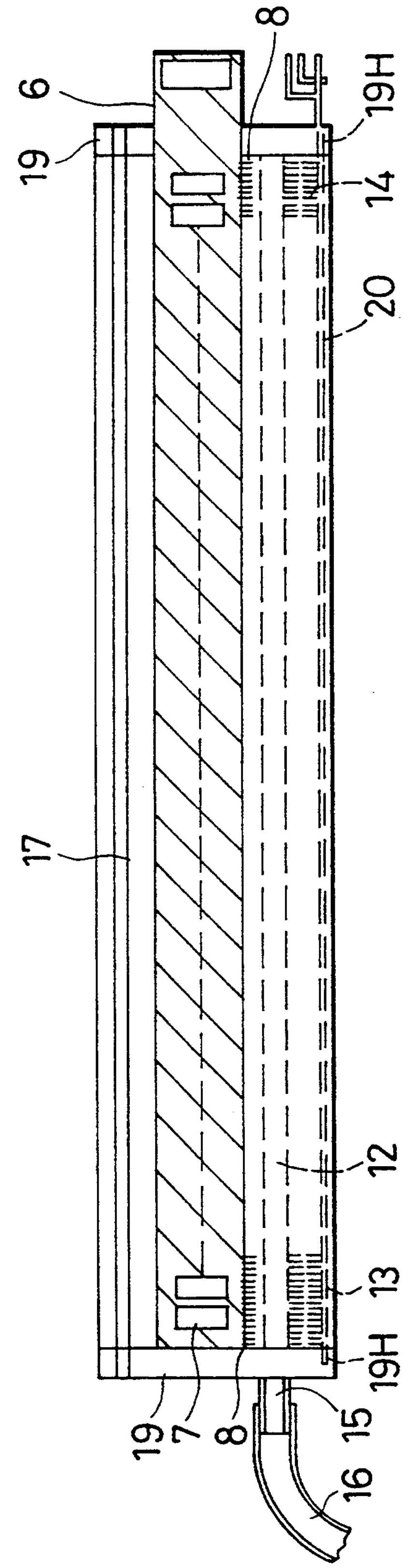
FIG. 15 is a transverse cross sectional view of the solid ion recording head of FIG. 14.

Here, as shown in a transverse cross sectional view of this solid ion recording head 3 shown in FIG. 15 in which the resin mold 9 and the metal cover 10 are not depicted, the head support member 5 has an air inlet port 15 connected to the air supply port 12 at one end, to which the compressed air is transmitted from a compressor (not shown) through an air duct 16.

Also, the head support member 5 has a pair of slide grooves 17 on its side faces in a vicinity of its upper side end, which are to be engaged with a pair of slide rails 18 provided in a printer (not shown) in which this solid ion recording head 3 is to be installed, such that the solid ion recording head 3 can be slid along the slide rails 18 in order to find the appropriate recording position. Moreover, the solid ion recording head 3 as a whole can be taken out from the printer by disengaging the slide grooves 17 from the slide rails 18.

Moreover, in this solid ion recording head 3, the ion generator 20 is made to be removable from the rest of the solid ion recording head 3 such that the ion generator 20 alone can be replaced by a new one whenever necessary, without replacing the entire solid ion recording head 3. More specifically, as shown in FIG. 15, side plates 19 of the head support member 5 have ion generator positioning holes 19H such that the ion generator 20 can be properly mounted on the solid ion recording head 3 by inserting it into the ion generator positioning holes 19H, while the ion generator 20 can also be removed from the solid ion recording head 3 by pulling it out of the ion generator positioning holes 19H.

This configuration of the solid ion recording head 3 shown in FIG. 14 has a significant advantage in reduction of the size of the recording head in the printer.

Now, the further derail of each part of the solid ion recording head 3 of this embodiment will be described with references to the drawings.

First, with reference to FIG. 16, the ion generation device configuration formed by the ion generator 20 and the control substrate 30 will be described in derail.

In this embodiment, the ion generation device configuration formed by the ion generator 20 and the control substrate 30 has a structure which is equivalent in principle to that shown in FIG. 16 which will now be described in derail. The actual physical layout for this ion generation device configuration will be described later.

In the following description of this configuration of FIG. 16, it is assumed that a surface of a recording drum 1 which functions as a recording medium is pre-charged with negatively charged ions, such that the electrostatic latent image can be formed on the surface of the recording drum 1 by the irradiation of positively charged ions from the ion recording head 3.

Figure 16:
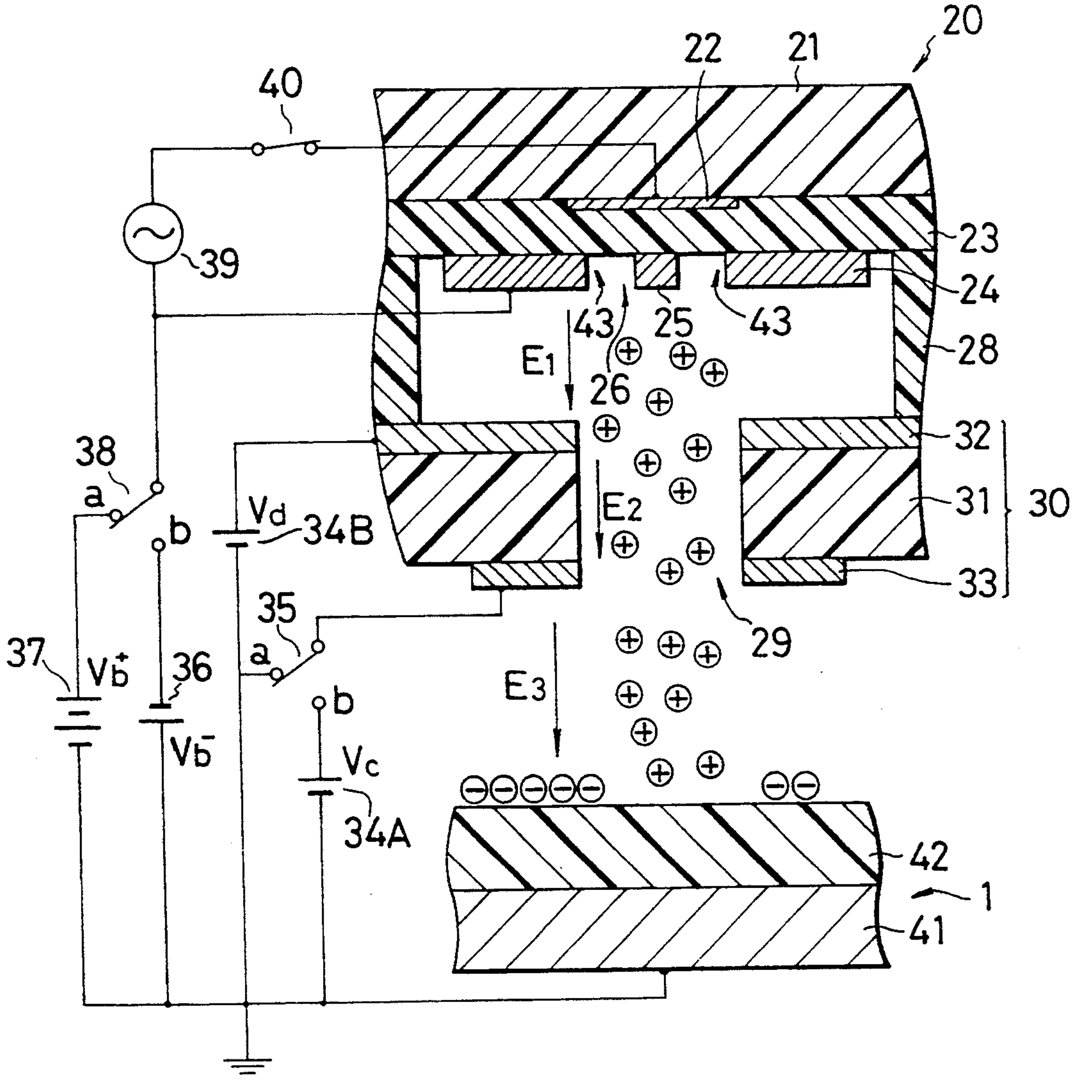
FIG. 16 is a cross sectional view of one embodiment of an ion generation device in the solid ion recording head of FIG. 14.

In FIG. 16, the ion generator 20 comprises: an insulative substrate 21 such as a ceramic substrate; an induction electrode 22 of two to three μm thickness formed on a lower side of the insulative substrate 21; an insulation layer 23 of approximately 20 μm thickness formed on the lower side of the insulative substrate 21 and covering the induction electrode 22; ion generation electrodes 24 of approximately 18 μm thickness formed on a lower side of the insulation layer 23; and a barrier electrode 25 sandwiched between the ion generation electrodes 24 with a slit 26 of approximately 40 μm width formed between the barrier electrode 25 and each of the ion generation electrodes 24, which is maintained at the same voltage level as the ion generation electrodes 24.

On the other hand, the control substrate 30 comprises: an insulative substrate 31; and second control electrodes 32 and 33 formed on lower sides of the insulative substrate 31, respectively, with a multiplicity of the ion passing holes 29 piercing through the whole control substrate 30 arranged along a transverse direction which is normal to a sheet on which FIG. 16 is drawn. The insulative substrate 31 is formed from a glass polyimide sheet of 100 μm thickness for example, on both sides of which copper foils of 18 μm thickness each are attached as the first and second control electrodes 32 and 33, while the ion passing holes 29 of approximately 100 μm diameter are formed with 200 μm pitch by drilling.

This control substrate 30 is attached below the ion generator 20 by spacer members 28 of an appropriate thickness in a range of 100 to 500 μm, with a center of each of the ion passing holes 29 aligned to a center of the barrier electrode 25.

The recording drum 1 comprises an A1 drum 41 made from a conductive body and a dielectric body layer 42 made from a fluorine resin of 10 to 50 μm thickness and formed over the A1 drum 41, where the surface of the recording drum 1 is located at a position approximately 500 μm below the control substrate 30.

Figure 17:
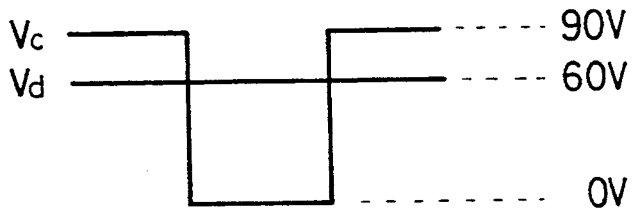
FIG. 17 is a diagram for explaining voltage levels appearing in the ion generation device of FIG. 16.

The dielectric body layer 42 of this recording drum 1 is pre-charged to a surface voltage level of approximately −600 V, while the A1 drum 41 of the recording drum 1 is maintained at the ground voltage level. The first control electrode 32 is maintained at a positive voltage level Vd by a positive voltage source 34B, whereas the second control electrode 33 is maintained at the ground voltage level at a time of recording operation by connecting a switch 35 to a terminal a, and at a positive voltage level Vc by a positive voltage source 34A at a time of non-recording operation by connecting the switch 35 to a terminal b, where the voltage level Vc is higher than the voltage level Vd as shown in FIG. 17. The ion generation electrodes 24 and the barrier electrode 25 are maintained at a negative bias voltage level Vb− by a negative bias voltage source 36 at a time of non-recording operation by connecting a switch 38 to a terminal b, and at a positive bias voltage level Vb+ by a positive bias voltage source 37 at a time of recording operation by connecting the switch 38 to a terminal a. Also, at a time of recording operation, an AC voltage for causing the corona discharge is applied between the induction electrode 22 and the ion generation electrodes 24 from an AC voltage source 39 by closing a switch 40, whereas the switch 40 is opened at a time of non-recording operation. Thus, the switching configuration depicted in FIG. 16 is that for a time of recording operation, in which the positive ions are generated at regions 43 in a vicinity of side faces of the ion generation electrodes 24 facing toward the slit 26.

In this ion generation device configuration of FIG. 16, the mechanism for generating the ions is as follows. When the AC voltage applied between the induction electrode 22 and the ion generation electrodes 24 becomes large, an amount of the gaseous molecules in a vicinity of the ion generation electrodes 24 which are ionized also becomes large. In other words, there is always a small amount of ions in the air, but when a large electric field is formed, the ions are accelerated such that they collide with and ionize the surrounding gaseous molecules. When this ionization of the gaseous molecules becomes sufficiently large, the insulation property of the gas is lost and the electric discharge occurs. This electric discharge will eventually stop as the surrounding dielectric body surfaces are charged by the electric discharge. When the polarity of the electric field due to the AC voltage is reversed, the surrounding dielectric body surfaces are charged by the ions of the opposite polarity.

The density of the ions so generated in the ion generation device configuration of FIG. 16 depends on the peak voltage level and the frequency of the AC voltage to be applied between the induction electrode 22 and the ion generation electrodes 24, and can be as high as $10^{-4}$ to $10^{-3}$ A/cm which is enormously high compared with that obtainable by a conventional corona charger. In the present embodiment, the peak voltage of the AC voltage is set to be 1 to 3 $kV_{p-p}$, and the frequency of the AC voltage is set to be approximately 50 kHz.

At a time of recording operation, the first control electrode 32 is maintained at the control voltage level Vd of approximately 60 V while the ion generation electrodes 24 are applied with the bias voltage Vb+ of approximately 240 V, so that the electric field $E_1$ is formed between the ion generation electrodes 24 and the first control electrode 32, such that only the positively charged ions are moved toward the first control electrode 32.

In the ion passing holes 29, the first control electrode 32 continues to be maintained at the control voltage level Vd of approximately 60V, while the second control electrode 33 is maintained at the ground voltage level, so that the electric field $E_2$ is formed in the ion passing holes 29, such that only the positively charged ions can pass through the ion passing holes 29.

Then, as the surface of the dielectric body layer 42 of the recording drum 1 is uniformly pre-charged at approximately −600 V, the electric field $E_3$ is formed between the second control electrode 33 and the recording drum 1, such that the positively charged ions passed through The ion passing holes 29 are moved toward the recording drum 1 so as to form the electrostatic latent image on the surface of the dielectric body layer 42 of the recording drum 1.

On the other hand, at a time of non-recording operation, the switch 35 is switched from the terminal a to the terminal b in order to maintain the second control electrode 33 at the control voltage level of approximately 90 V, such that the direction of the electric field $E_2$ is reversed so as not to pass any positively charged ions through the ion passing holes 29.

As described above, according to this configuration of FIG. 16, the control voltage of less than one hundred volts is sufficient for the the ion beam control in contrast to the conventional configuration in which the control voltage of several hundreds volts has been necessary. The following points have the major contribution to this reduction of the control voltage. First, the width of the slit 26 is made to be as small as approximately 40 μm by providing the barrier electrode 25 between the ion generation electrodes 24 such that the high AC voltage from the AC voltage source 39 does not affect the electric field between the first and second control electrodes 32 and 33. Secondly, the surface of the dielectric body layer 42 of the recording drum 1 is uniformly pre-charged by the negatively charged ions in advance such that the positively charged ions are accelerated toward the recording drum 1 by the electric field formed by the negatively charged ions on the surface of the dielectric body layer 42 of the recording drum 1.

In this configuration of FIG. 16, in a case of forming the ion generator 20 and the control substrate 30 integrally, it is necessary to optimally set the distance between the ion generator 20 and the control substrate 30 by using the spacer members 28. By placing the control substrate 30 closer to the ion generator 20, the generated ions can be taken out more efficiently. However, the electric field due to the leak of the AC voltage to be applied to the ion generator 20 from the AC voltage source 39 becomes larger at the position closer to the ion generator 20. Thus, when the control substrate 30 is placed too close to the ion generator 20, the leaking electric field becomes larger than the ionization electric field of the air (30 kV/cm) such that the spark discharge is caused between the ion generator 20 and the first control electrode 32. For this reason, it is preferable not to place the first control electrode 82 of the control substrate 30 at a position closer to the ion generator 20 than a distance for which the leaking electric field becomes larger than the spark discharge start electric field.

In addition, when there is a relationship of $E_3 > E_2 > E_1$ among the electric fields utilized in the ion generation device configuration of FIG. 16, the lens effect due to the electric fields can be obtained such that the ions can be brought to the recording medium more efficiently, the ion beam can be squeezed more tightly such that picture dots of finer precision can be obtained.

Furthermore, in order to obtain the stable recorded images, the ratio of the ions used for the image recording, i.e., the ions passing through the ion passing holes 29, with respect to the ions generated at the ion generator 20 should preferably be smaller. In the present embodiment, the conditions are set such that this ratio takes a value below 0.5.

Figure 18:
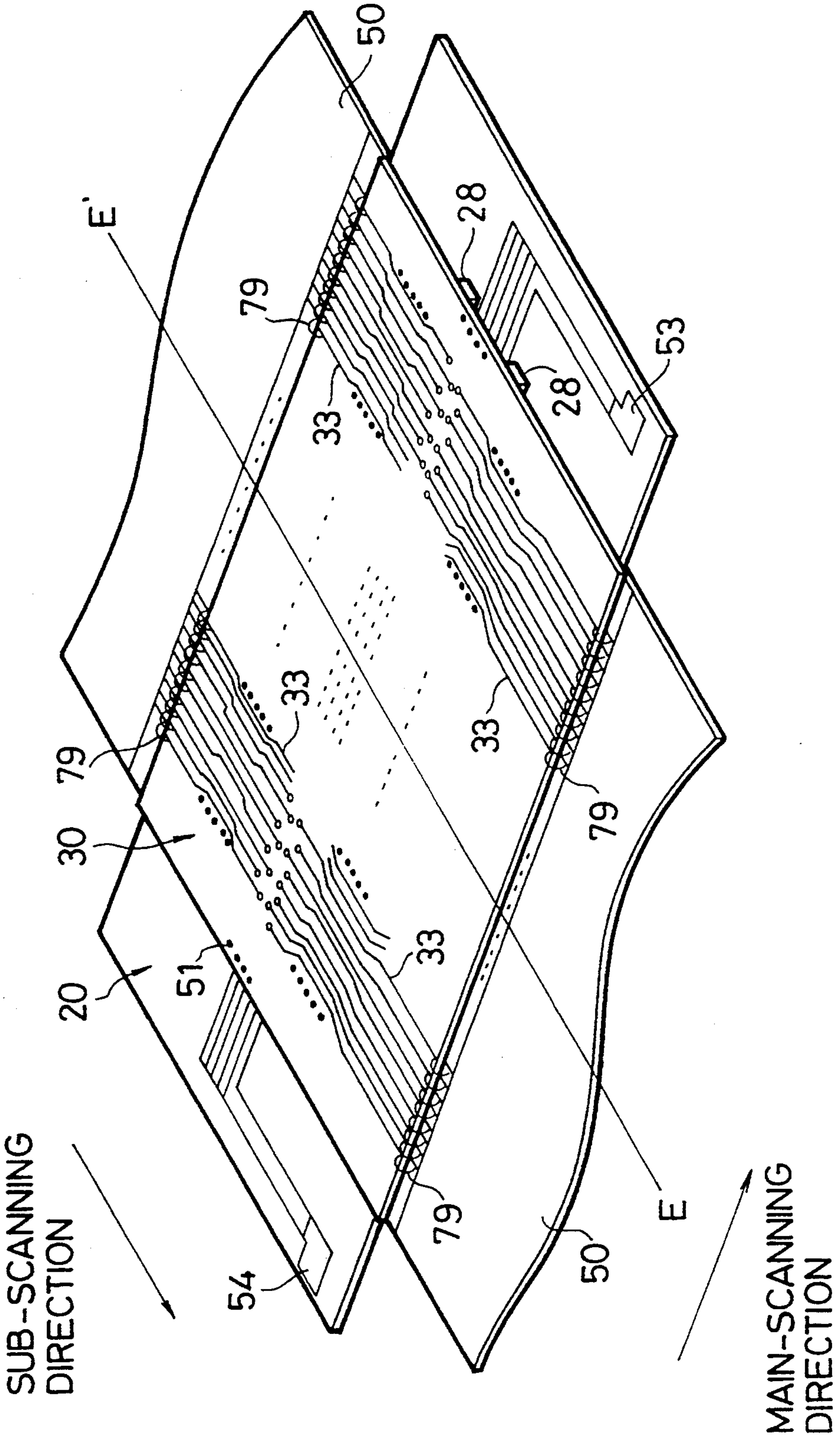
FIG. 18 is a perspective view of a physical configuration of the ion generation device in the solid ion recording head of FIG. 14.

Referring now to FIG. 18, the detailed physical configuration of the solid ion recording head 3 of this embodiment will be described.

FIG. 18 shows a view of the ion generation device portion of the solid ion recording head 3 from a side of the recording drum 1, and as shown in FIG. 18, the ion generation device portion of this solid ion recording head 3 comprises: the ion generator 20 and the control substrate 30 separated by the spacer members 28 inserted therebetween: and two flexible printed cables 50, connected to the control substrate 30 through wire bondings 79, for supplying control signals from the driver ICs 7 of the driving circuit substrates 6 in order to control the passing of the ions through the ion passing holes 29 on the control substrate 30 which correspond to the picture dots to be recorded. Since this FIG. 18 is a view from a side of the recording drum 1, the second control electrode 33 on the lower side of the control substrate 30 is visible on a surface of the control substrate 32 while the first control electrode 32 on the upper side of the control substrate 30 is not visible as it is located on a back side of the control substrate 30 in FIG. 18.

Each of the first and second control electrodes 32 is made from a metallic layer uniformly formed on one side of the insulative substrate 31 of the control substrate 30, on which 250 sets of a group of the four ion passing holes 29 arranged in the sub-scanning direction are arranged in the main scanning direction such that there are 1000 ion passing holes 29 in total for recording 1000 picture dots. A zigzag shaped arrangement of four ion passing holes 29 in the sub-scanning direction in each set will be described in detail later.

Near the side ends of the control substrate 30 on the lines in the main scanning direction along which the groups of the ion passing holes 29 are arranged, there are a plurality of positioning holes 51, while on several locations on the control substrate 30 beside the ion passing holes 29, there are a number of adhesive injection holes 52 through which the adhesives for holding the ion generator 20 and the control substrate 30 integrally are injected.

On the ion generator 20, a first metallic layer terminal 53 to be connected to the induction electrode 22, and a second metallic layer terminal 54 to be connected to the ion generation electrodes 24 and the barrier electrode 25 are provided.

Next, the physical configuration of each component of the solid ion recording head 3 of this embodiment will be descried in detail.

First, with reference to FIG. 19, the physical configuration of the ion generator 20 will be described in detail.

Figure 19:
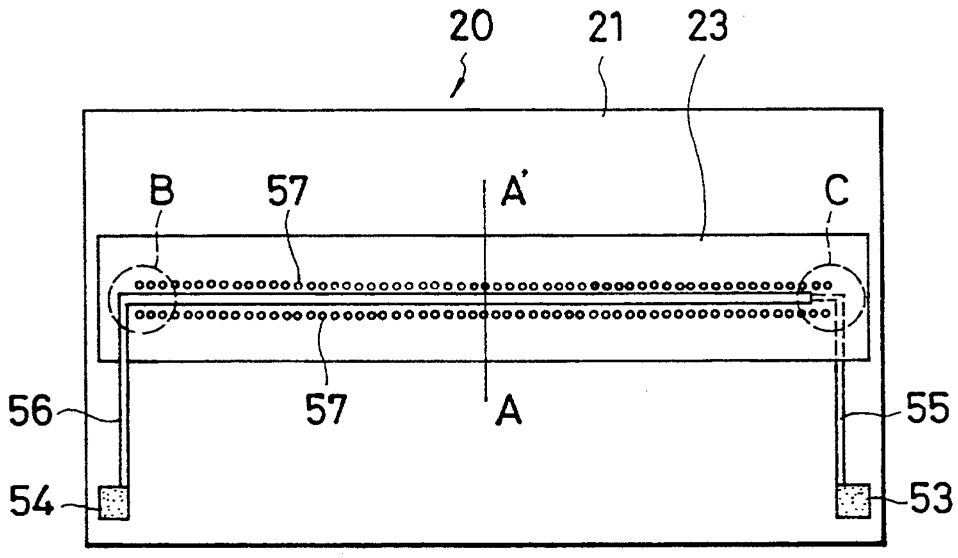
FIG. 19 is a plan view of a physical configuration of an ion generator in the ion generation device of FIG. 18.

FIG. 19 shows an entire view of the ion generator 20 in which a first metallic layer 55 connected to the induction electrode 22 is formed in few μm thickness over the insulative substrate 21 made from the ceramic substrate. Then, the insulation layer 23 made from a glass containing SiC is formed over the first metallic layer 55. Then, on this insulation layer 23, a second metallic layer 56 connected to the ion generation electrodes 24 and the barrier electrode 25 is formed. The ion generation electrodes 24 and the barrier electrodes 25 are then formed on this second metallic layer 56 by the etching process.

One end of the first metallic layer 55 has the first metallic layer terminal 53 for applying the bias voltages Vb+ and Vb− is formed, while one end of the second metallic layer 56 has the second metallic layer terminal 54 for applying the AC voltage.

This physical configuration of the ion generator 20 can be manufactured entirely by using the thick film printing technique.

On the insulative substrate 21, a plurality of air inlet holes 57 with 1 mm diameter each are formed in two lines at 2 mm pitch on both sides of the ion generation unit by using the laser manufacturing technique.

Figure 20:
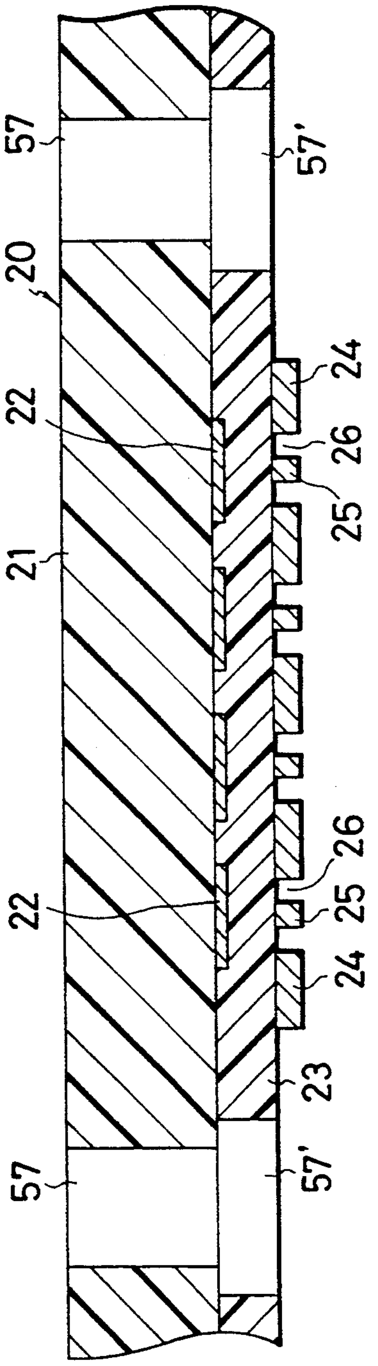
FIG. 20 is a cross sectional view of a physical configuration of one embodiment of the ion generator in the ion generation device of FIG. 18 at A—A' line indicated in FIG. 19.

Here, as shown in FIG. 20 showing a cross sectional view at A—A′ line indicated in FIG. 19, each of the air inlet holes 57 is accompanied with an air inlet hole 57′ formed on the insulation layer 23. From these air inlet holes 57 and 57′, the compressed air from the air supply port 12 located on a back side of the ion generator 20 is injected through the air supply passages 14 in order to stabilize the operation of the ion generator 20.

Also, as shown in FIG. 20, the ion generation unit of this ion generator 20 actually contains four ion generation sections in correspondence to the group of four ion passing holes 29 shown in FIG. 18, where each of the ion generation sections is in an ion generation device configuration described above with reference to FIG. 16. Thus, there are actually five lines of the ion generation electrodes 24 with four lines of the barrier electrodes 25 located between the adjacent ion generation electrodes to form eight slits 26 between each ion generation electrode 24 and each barrier electrode 25, and four induction electrodes 22 formed above each pair of the slits 26, to form the four ion generation sections.

The pitch of the adjacent ion generation sections in FIG. 20 is equal to the pitch of the four ion passing holes 29 in FIG. 18, and in this embodiment it takes a value of 400 μm in a case of realizing the resolution of 10 dots/mm or 200 μm in a case of realizing the resolution of 20 dots/mm. Also, in this embodiment, the width of each barrier electrode 25 is approximately 40 μm, and the width of each slit 26 is also approximately 40 μm.

Figure 21:
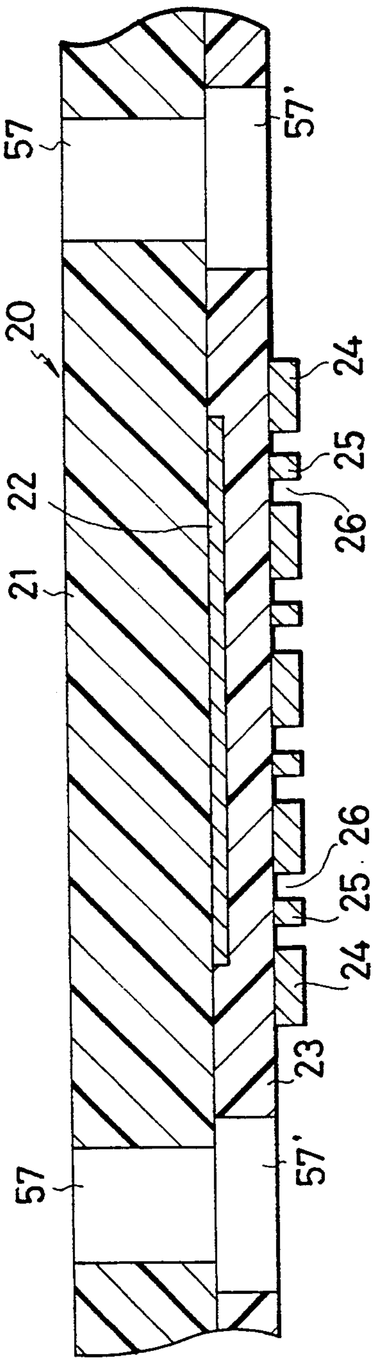
FIG. 21 is a cross sectional view of a physical configuration of another embodiment of the ion generator in the ion generation device of FIG. 18 at A—A' line indicated in FIG. 19.

Alternatively to the configuration of FIG. 20, the ion generation unit may be formed to have a cross sectional view as shown in FIG. 21, in which a single common induction electrode 22 is provided for all of the four ion generation sections. This configuration of FIG. 21 has an advantage that the manufacturing precision required for the induction electrode 22 can be relaxed, while the positioning precision required for the positioning of the induction electrode 22 with respect to the ion generation electrodes 24 and the barrier electrodes 25 can also be relaxed. However, this configuration of FIG. 21 also has a disadvantage that the AC voltage source of the large current capacity is necessary because the capacitance between the electrodes becomes large.

Figure 22:
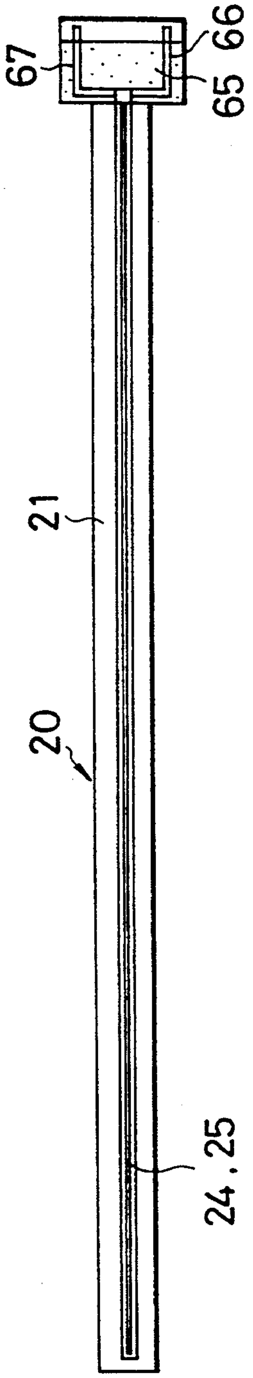
FIG. 22 is a plan view of a bottom face of an ion generating section of the ion generator in the ion generation device of FIG. 18.

The ion generation unit of the ion generator 20 also has an overall lower side view as shown in FIG. 22, where an insulative body layer 65 of few μm thickness is selectively formed over an unnecessary end portion of the ion generation electrodes 24 and the barrier electrodes 25 in order to prevent the unnecessary ion generations. At this end portion of the ion generation electrodes 24 and the barrier electrodes 25, there are provided a DC bias voltage terminal 66 for applying the DC bias voltage to the ion generation electrodes 24 and the barrier electrodes 25, and an AC voltage terminal 67 for applying the AC voltage of approximately 3 $kV_{p-p}$ to the ion generation electrodes 24 and the barrier electrodes 25 with respect to the induction electrode 22, where the DC bias voltage and the AC voltage are supplied through a high voltage connector (not shown). Here, it is necessary to provide an ample distance between these terminals 66 and 67 in order to avoid making the electric field between the electrodes to exceed the discharge start electric field such that the discharge is caused.

Figure 23:
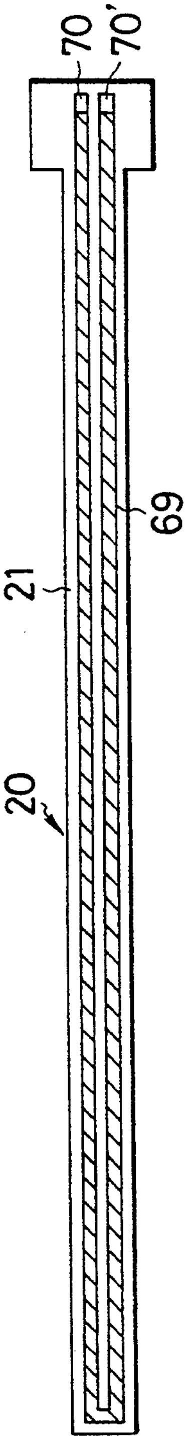
FIG. 23 is a plan view of a top face of an ion generating section of the ion generator in the ion generation device of FIG. 18.

The ion generation unit of the ion generator 20 also has an overall upper side view as shown in FIG. 23. As shown in FIG. 23, on the upper side of the insulative substrate 21, there is provided a heating resistor member 69. This heating resistor member 69 heats up the ion generator 20 when the DC voltage is applied to its two terminals 70 and 70'. This heating of the ion generator 20 has a function of thermally decomposing the nitrogen oxides generated by the discharge, which contribute to the longer life-time of the ion generator 20.

Figure 24:
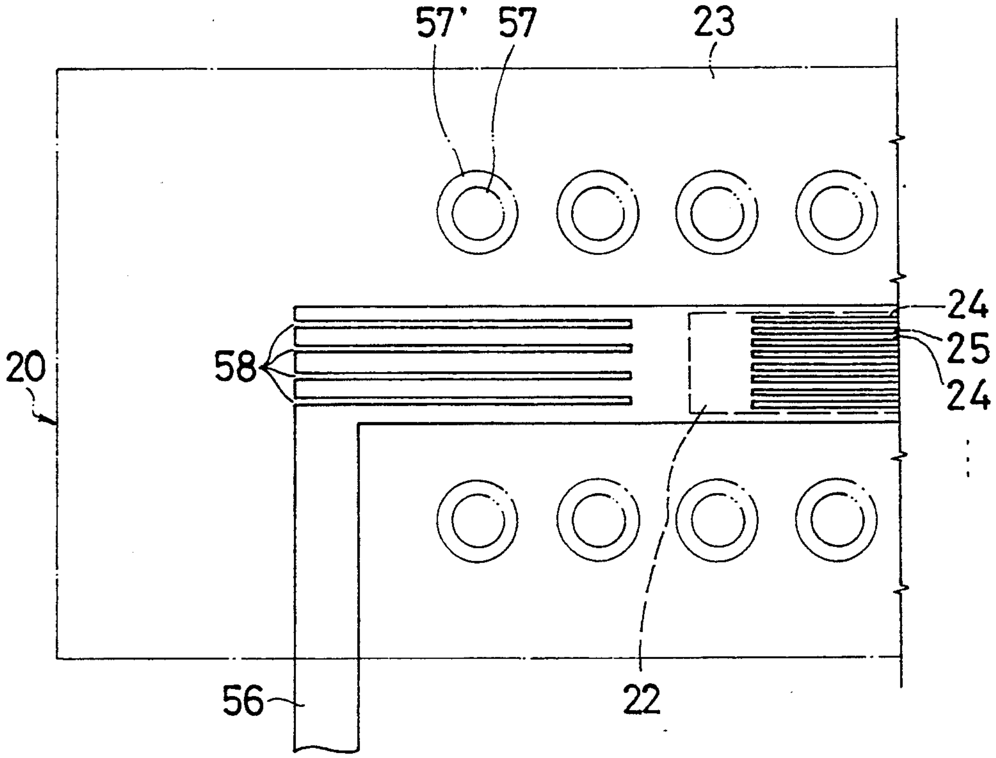
FIG. 24 is an expanded view of an encircled portion B of the ion generator shown in FIG. 19.
Figure 25:
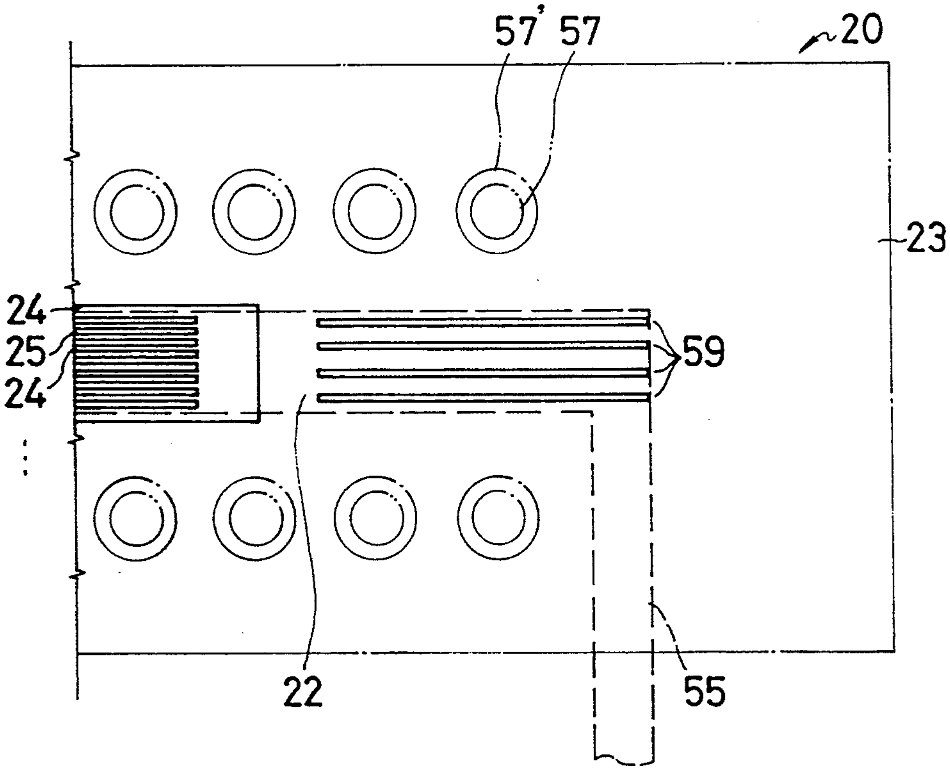
FIG. 25 is an expanded view of an encircled portion C of the ion generator shown in FIG. 19.

In the configuration of FIG. 19, a portion enclosed by a dash line circle B has a detail configuration shown in FIG. 24, while a portion enclosed by a dash line circle C has a detail configuration shown in FIG. 25. In these FIGS. 24 and 25, a single induction electrode 22 of a type shown in FIG. 21 is depicted for the sake of clarity. As shown in FIGS. 24 and 25 as well as in FIGS. 20 and 21, the air inlet hole 57' formed on the insulation layer 23 has a diameter larger than that of the air inlet hole 57 formed on the insulative substrate 21, such that the injection of the air can be secured within a range of the positioning precision.

Also, as shown in FIG. 24, the corner of the second metallic layer 56 has four cutting grooves 58, while as shown in FIG. 25, the corner of the first metallic layer 55 has four bar patterns 59. These cutting grooves 58 and the bar patterns 59 are for the positioning of the control substrate 30 to be mounted thereon. In this embodiment, these cutting grooves 58 and the bar patterns 59 have approximately 40 μm width each and are arranged at 400 μm pitch in a case of realizing the resolution of 10 dots/mm or 200 μm pitch in a case of realizing the resolution of 20 dots/mm.

Figure 26:
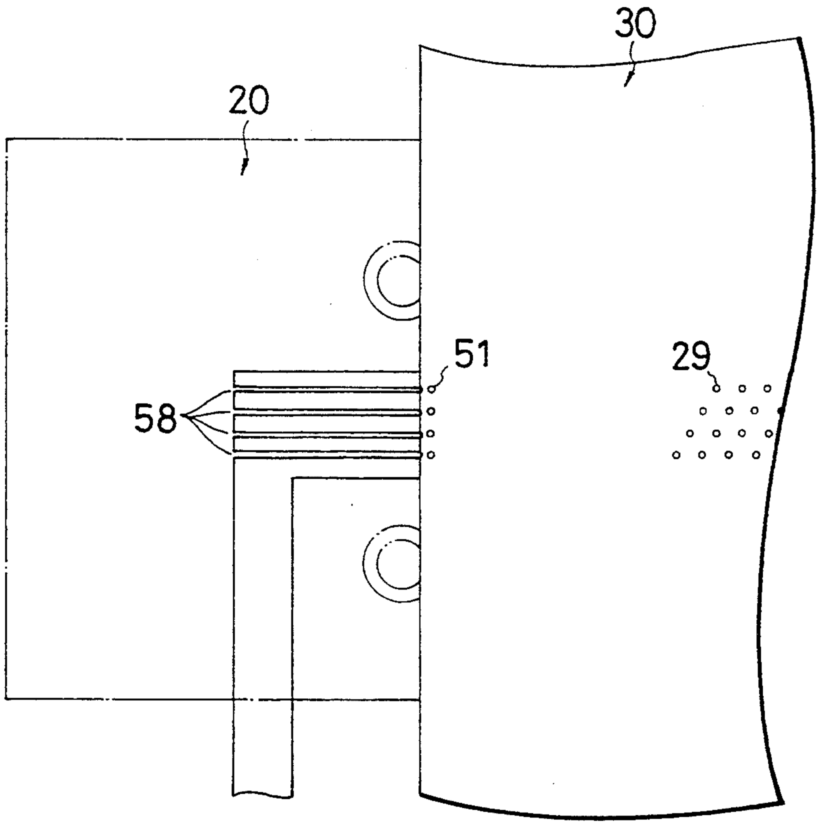
FIG. 26 is an expanded view of an encircled portion B of the ion generator shown in FIG. 19 with a control substrate positioned over the ion generator.
Figure 27:
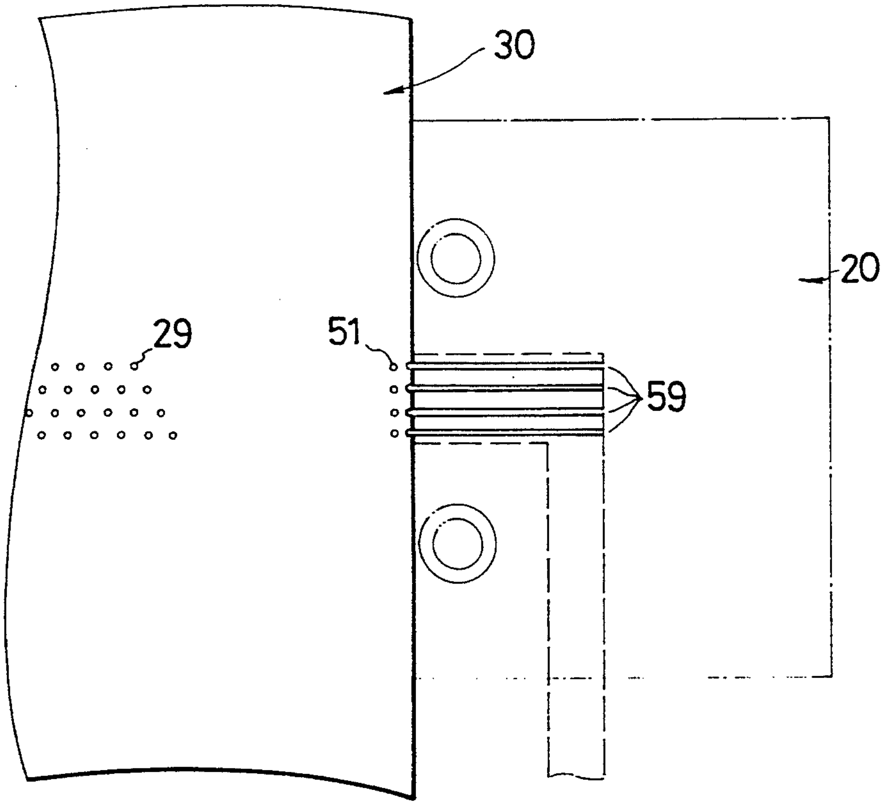
FIG. 27 is an expanded view of an encircled portion C of the ion generator shown in FIG. 19 with a control substrate positioned over the ion generator.

Thus, as shown in FIGS. 26 and 27, the control substrate 30 can be positioned properly by aligning each group of the four ion passing holes 29 with these cutting grooves 58 and the bar patterns 59. This aligning of the ion passing holes 29 with the cutting grooves 58 and the bar patterns 59 is facilitated by using the positioning holes 51 provided near the side ends of the control substrate 30. Here, in this embodiment, the cutting grooves 58 and the bar patterns 59 are located on the lines along which the barrier electrodes 25 are arranged, so that when the control substrate 30 is positioned properly, the center of each ion passing hole 29 is aligned with the center of each barrier electrode 25, as in the ion generation device configuration of FIG. 16. By pouring the adhesive into the adhesive injection holes 52 provide a on the control substrate 30 when the control substrate 30 is properly positioned as described above, the ion generator 20 and the control substrate 30 with the spacer members 28 therebetween can be made into an integral structure.

Figure 28:
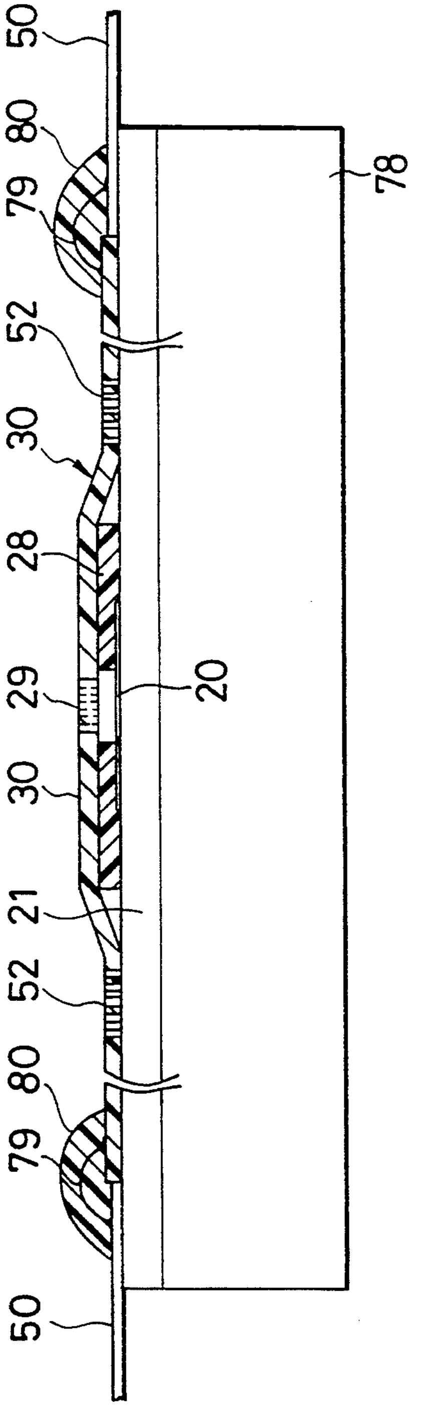
FIG. 28 is a cross sectional view of the ion generation device of FIG. 18 at E—E' line indicated in FIG. 18.

On the other hand, as shown in FIG. 28 showing a cross sectional view at E—E' line indicated in FIG. 18, the connection of the control substrate 30 and each of the flexible printed cables 50 is achieved by the wire bondings 79. In this case, the flexible printed cables 50 are attached to a head holding base member 78, and the connection electrodes of the second control electrode 33 and the flexible printed cables 50 are connected by the wire bondings 79. Then, for the purpose of improved insulation and strength, each wire bonding 79 is covered by a resin mold 80. Alternatively, the connection of the control substrate 30 and each of the flexible printed cables 50 may be achieved by the pressure welding.

Now, with reference to FIGS. 29 to 31, the physical configuration of the control substrate 30 will be described in detail.

Figure 29:
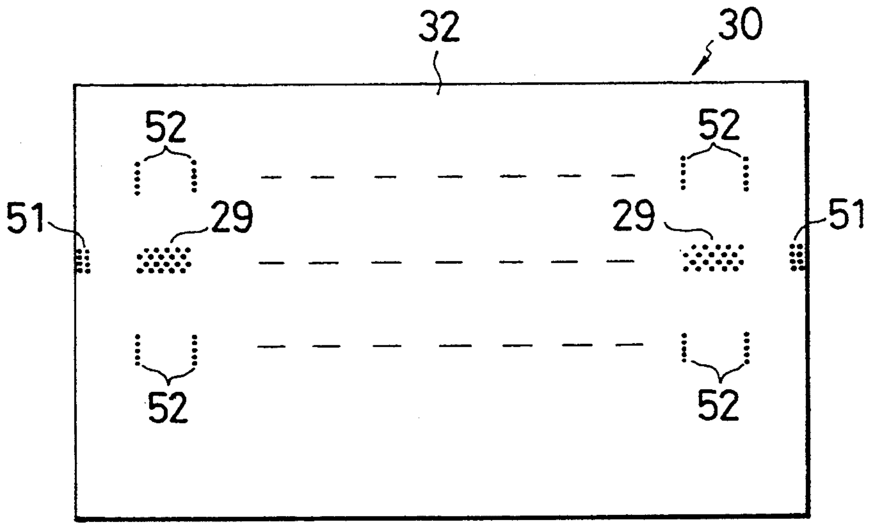
FIG. 29 is a plan view of a physical configuration of one embodiment of a first control electrode in the ion generation device of FIG. 18.

FIG. 29 shows an overall view of one possible configuration of the control substrate 30 from a side of the ion generator 20, such that only the first control electrode 32 is visible. In this configuration of FIG. 29, the entire first control electrode 32 is formed from a single electrode member with the ion passing holes 29, the positioning holes 51 and the adhesive injection holes 52 provided thereon.

Figure 30:
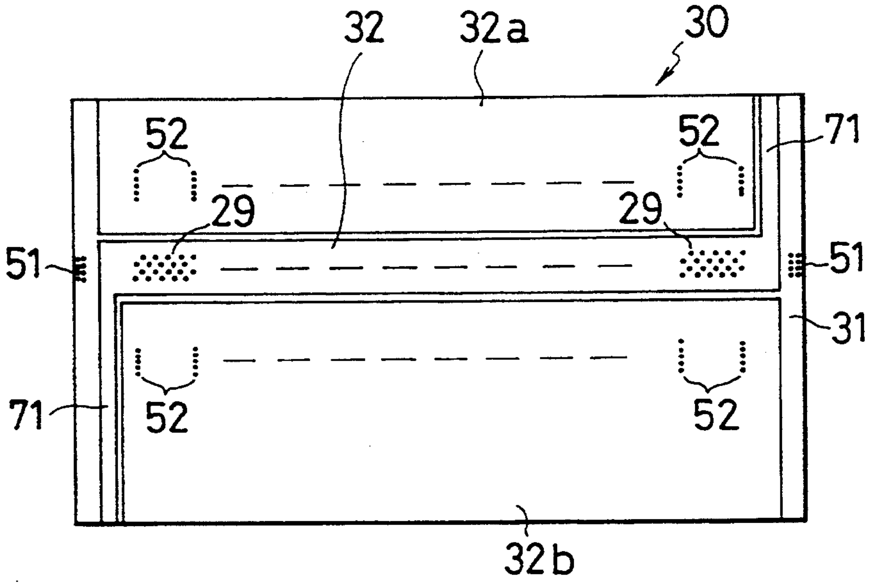
FIG. 30 is a plan view of a physical configuration of another embodiment of a first control electrode in the ion generation device of FIG. 18.

FIG. 30 shows an overall view of another possible configuration of the control substrate 30 from a side of the ion generator 20, in which only the first control electrode 32 is visible again. In this configuration of FIG. 30, a single electrode forming the first control electrode 32 in FIG. 29 is further etched to limit the first control electrode 32 around the ion passing holes 29 such that the area of the first control electrode 32 can be reduced. The reduction of the area of the first control electrode 33 as shown in FIG. 30 has the advantage that the capacitance between the first and second control electrodes 32 and 33 can be reduced, so that the current capacity of the driving circuits and driving power source can also be reduced. In the configuration of FIG. 30, the terminal lines 71 are extended from the ends of the first control electrode 32 toward the edges of the control substrate 30 in order to make connections with the connection electrodes of the control substrate 30. The extraneous portions **32*a* and 32*b* separated from the first control electrode 32 by the above described etching process are in principle unnecessary, but in this embodiment, these extraneous portions 32*a* and 32*b* are left in an electrically disconnected state in order to provide the added strength to the control substrate 30, and the adhesive injection holes 52 are provided thereon, whereas the positioning holes 51 are provided on the insulative substrate 31**.

Figure 31:
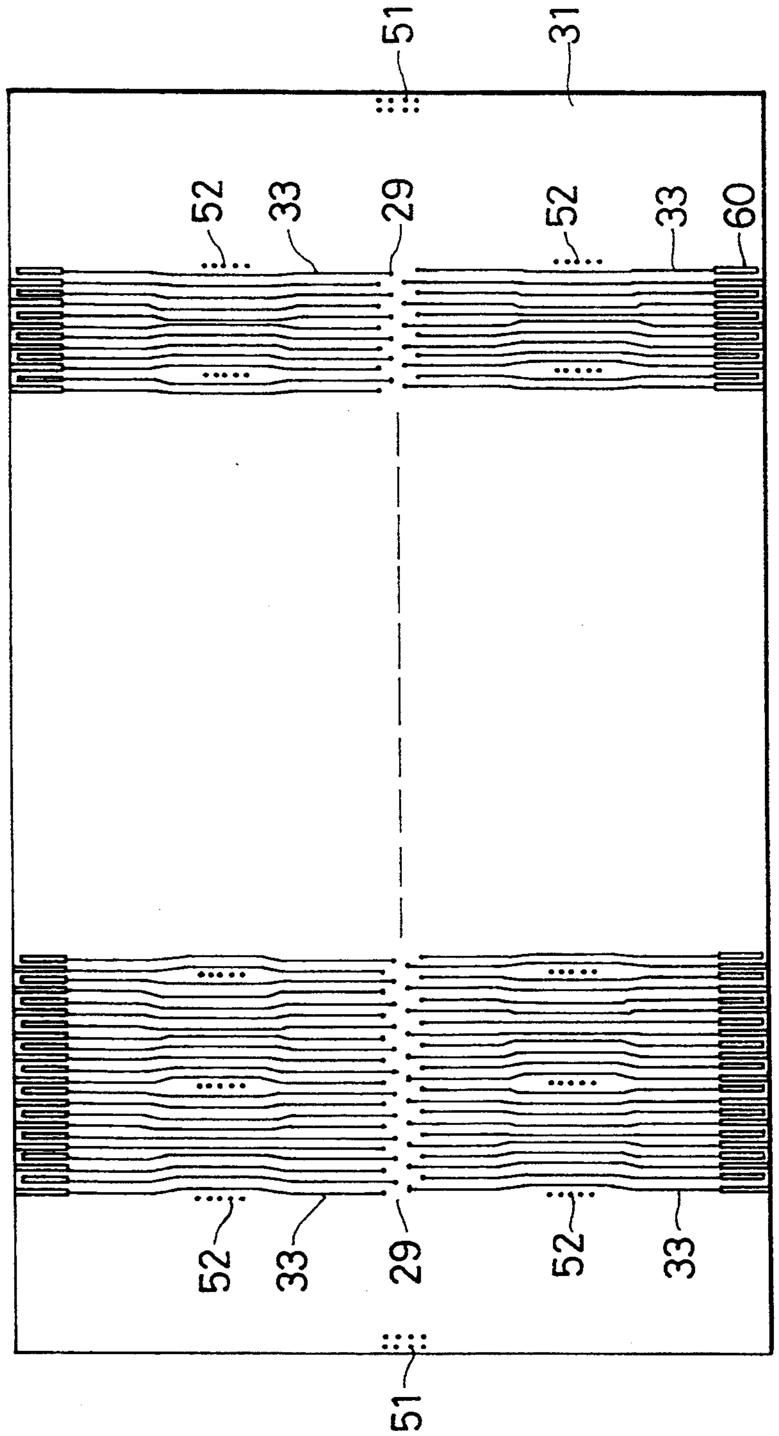
FIG. 31 is a plan view of a physical configuration of a second control electrode in the ion generation device of FIG. 18.

FIG. 31 shows an overall view of the control substrate 30 from a side of the recording drum 1, such that only the second control electrode 33 is visible.

As shown in FIG. 31, the second control electrode 33 is minutely patterned to form different independent line sections in correspondence to each of the ion passing holes 29 such that a different control voltage can be applied to each of the ion passing holes 29 independently, in contrast to the first control electrode 32 described above which is common to all the ion passing holes 29. In FIG. 31, the positioning holes 51 and the adhesive injection holes 52 are provided on the insulative substrate 31.

Each independent line section of the second control electrode 33 is extended in the sub-scanning direction and its end is connected to a connection terminal 60 for the connection with the flexible printed cable 50, such that the control voltage from the driver ICs 7 of the driving circuit substrates 6 can be transmitted to each line section of the second control electrode 33 independently through the flexible printed cables 50.

FIG. 31 shows a case for realizing the resolution of 10 dots/mm in which case the line sections of the second control electrode 33 are alternatively lead out to two opposite sides of the control substrate 30 in the subscanning direction, so that the pitch between the adjacent line sections on each side of the control substrate 30 is 200 μm (5 lines/mm).

The adhesive injection holes 52 are formed in groups of five, with 100 μm diameter each and 400 μm pitch between the adjacent ones, and one group of five adhesive holes 52 is provided for every 10 line sections of the second control electrode 38. Therefore, in a vicinity of the connection terminals 60 the line sections of the second control electrode 38 have the width of 100 μm each and the pitch of 200 μm between the adjacent ones, whereas in a vicinity of the adhesive injection holes 52 the line sections of the second control electrode 33 have the width of 92 μm each and the pitch of 184 μm between the adjacent ones.

In the configuration of FIG. 31, adjacent connection terminals 60 are formed to have different lengths in order to facilitate the easy positioning of the connection terminals 60 with respect to the flexible printed cables 50.

With this configuration in which the line sections of the second control electrode 33 are lead out to the opposite sides of the control substrate 30 in the sub-scanning direction, in a case of realizing the resolution of 10 dots/mm, the density of wirings is 5 lines/mm in a vicinity of the ion passing holes 29 as well as in a vicinity of the the connection terminals 60. On the other hand, in a case of realizing the resolution of 20 dots/mm, the density of wirings is 10 lines/mm in a vicinity of the ion passing holes 29.

Figure 32:
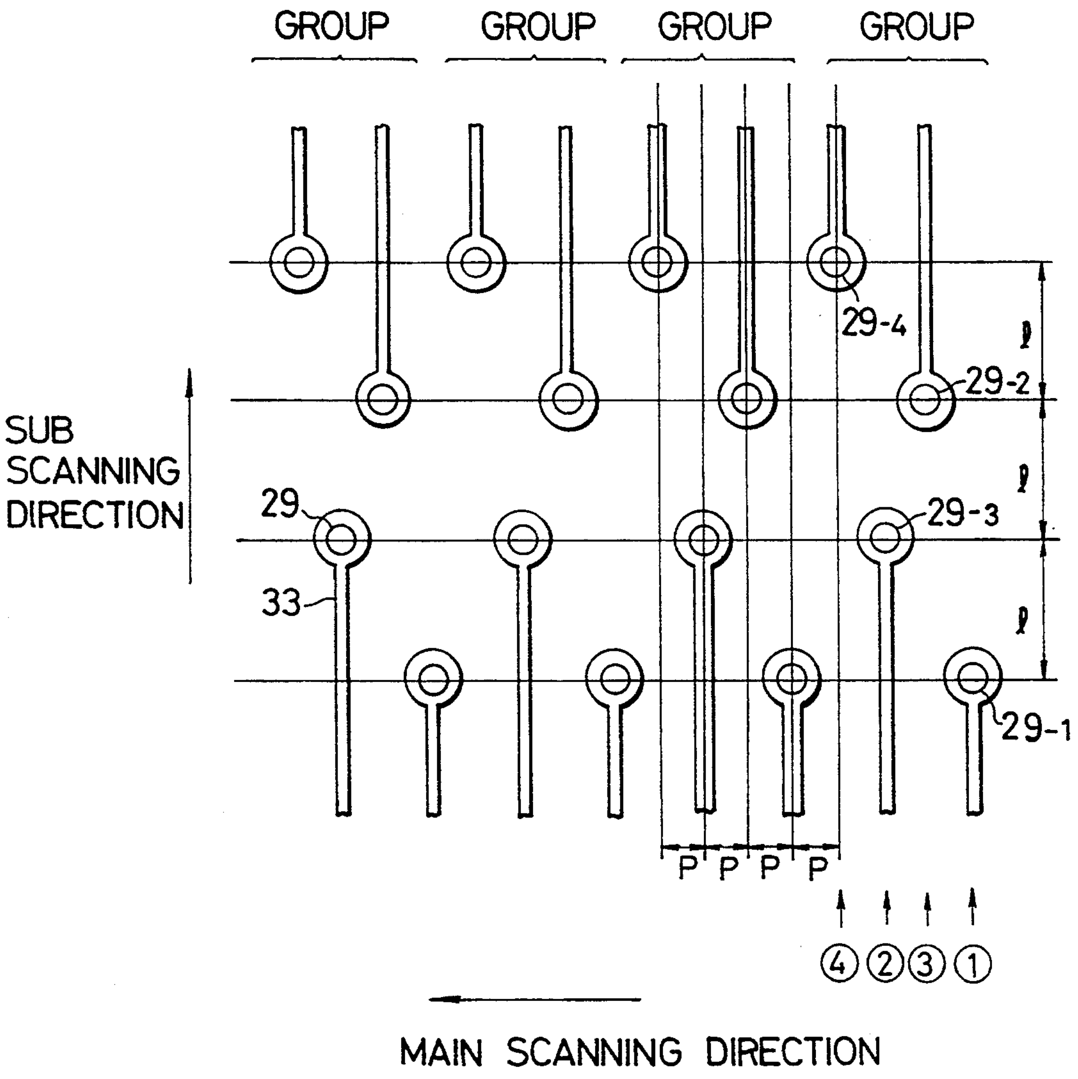
FIG. 32 is an illustration of an arrangement of ion passing holes on a control substrate in the ion generation device of FIG. 18 in which each four ion passing holes are grouped.

Referring now to FIG. 32, the arrangement of the ion passing holes 29 on the control substrate 30 in this embodiment will be described in detail.

In this embodiment, the ion passing holes 29 are arranged in groups of four ion passing holes 29, and within each group of four ion passing holes 29, four ion passing holes 29 are arranged such that the recording of picture dots is carried out in the order of the first ion passing hole 29-1 arranged first in the main scanning direction, the third ion passing hole 29-3 arranged third in the main scanning direction, the second ion passing hole 29-2 arranged second in the main scanning direction, and the fourth ion passing hole 29-4 arranged fourth in the main scanning direction, as indicated in FIG. 32.

Such an arrangement is actually realized by arranging the four ion passing holes 29-1 to 29-4 as follows. Namely, the adjacent ion passing holes 29 are arranged with a constant pitch P in the main scanning direction, while the distance between each of the first and third, third and second, and second and fourth ion passing holes in the sub-scanning direction is set to be l.

The reason for adopting this arrangement is the following.

First of all, the arrangement of the ion passing holes 29 linearly on a single line along the main scanning direction is impossible because the adjacent ion passing holes 29 would overlap with each other. For this reason, it is necessary to arrange a plurality of ion passing holes 29 (four in this embodiment) in the sub-scanning direction.

Secondly, when the four ion passing holes are arranged along an oblique line with a predetermined inclination angle with respect to the main scanning direction such that the recording of picture dots is carried out in the order of the first ion passing hole 29-1, second ion passing hole 29-2, third ion passing hole 29-3, and the fourth ion passing hole 29-4, there is a problem concerning the precision for the position of the picture dot from the ion passing hole which is placed in a middle of the above described order of recording such as the second and third ion passing holes.

Namely, the precision of the position of the second picture dot can be affected by the unbalanced presence of the first picture dot on an immediately next spot on one side of the space for the second picture dot while on the other side of the space for the second picture dot there are unrecorded spaces for the third and fourth picture dots and the first picture dot of the adjacent group is three spots away. Thus, the second dot has to be recorded at a space around which the first dots are distributed asymmetrically on both sides, and this affects the precision of the position of the second picture dot. Similarly, the precision of the position of the third picture dot can be affected by the unbalanced presence of the first and second picture dots on next two spots on one side to the space for the third picture dot while on the other side of the space for the third picture dot there is an unrecorded space for the fourth picture dot and the first and second picture dots of the adjacent group are two and three spots away.

For this reason, four ion passing holes 29-1 to 29-4 are arranged in this embodiment as described above, so that the recording of picture dots is carried out in the order of the first ion passing hole 29-1, the third ion passing hole 29-3, the second ion passing hole 29-2, and the fourth ion passing hole 29-4.

Figure 33:
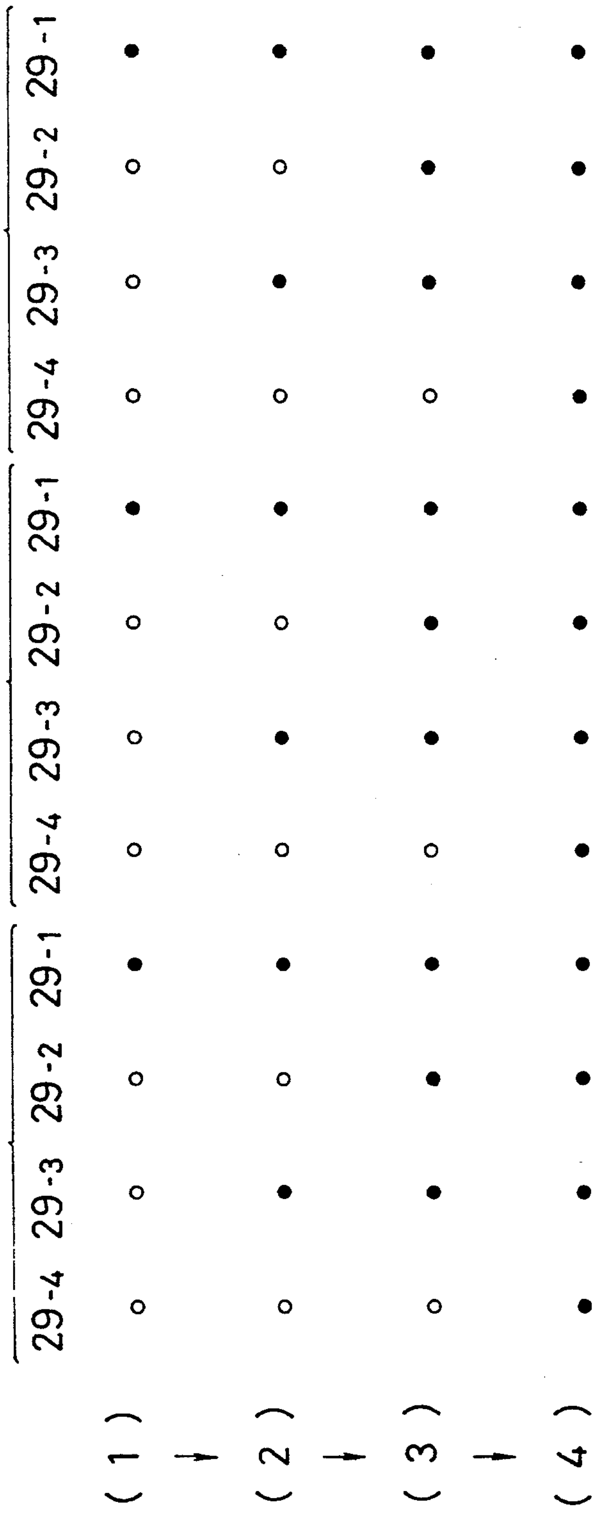
FIG. 33 is a sequential illustration of picture dots recorded by the ion passing holes arranged as shown in FIG. 32.

According to this order of recording, the recording of the first picture dot shown in line (1) of FIG. 33 is followed by the recording of the third picture dot, such that the precision for the position of the third picture dot will not be affected by the presence of the first picture dots because the already recorded first picture dots are distributed symmetrically on both sides of the space for the third picture dot as shown in line (2) of FIG. 33. Then, the recording of the third picture dot is followed by the recording of the second picture dot, such that the precision for the position of the second picture dot will also not be affected because the already recorded first and third picture dots are distributed symmetrically on both sides of the space for the second picture dot as shown in line (3) of FIG. 33. Finally, the recording of the second picture dot is followed by the recording of the fourth picture dot, such that the precision for the position of the fourth picture dot will also not be affected because the already recorded first, second, and third picture dots are distributed symmetrically on both sides of the space for the fourth picture dot as shown in line (4) of FIG. 33.

In determining the pitch P and the distance l in this configuration of FIG. 32, it should be taken into consideration that the limit for the line width that can be stably manufactured by the present day etching technique is approximately 30 μm, so that the distance between the closest ion passing holes 29 should be greater than this value in order to be able to manufacture the second control electrode 33.

Figure 34:
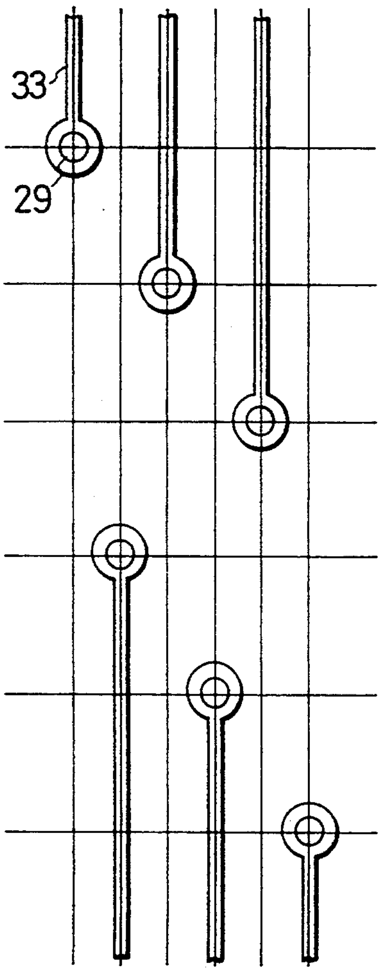
FIG. 34 is an illustration of an arrangement of ion passing holes on a control substrate in the ion generation device of FIG. 18 in which each six ion passing holes are grouped.
Figure 35:
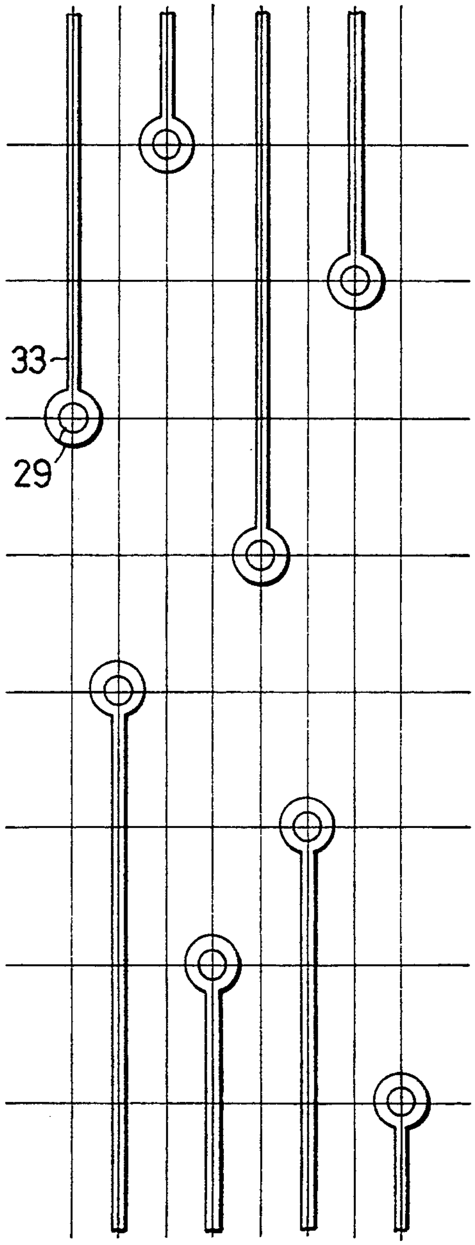
FIG. 35 is an illustration of an arrangement of ion passing holes on a control substrate in the ion generation device of FIG. 18 in which each eight ion passing holes are grouped.

Although the number of ion passing holes 29 to be grouped together and arranged in the sub-scanning direction is set to be four in this embodiment, this number of ion passing holes 29 to be grouped together may be changed to another number such as six or eight. In a case of grouping six ion passing holes 29 together, the exemplary arrangement of the six ion passing holes 29 for realizing the symmetrical distribution of the already recorded picture dots on both sides is as shown in FIG. 34. In this case, the order of recording is the first picture dot, third picture dot, fifth picture dot, second picture dot, fourth picture dot, and six picture dot. In a case of grouping eight ion passing holes 29 together, the exemplary arrangement of the eight ion passing holes 29 for realizing the symmetrical distribution of the already recorded picture dots on both sides is as shown in FIG. 35. In this case, the order of recording is the first picture dot, fifth picture dot, third picture dot, seventh picture dot, fourth picture dot, eighth picture dot, second picture dot, and sixth picture dot.

It is to be noted that the number of the ion passing holes to grouped together is preferably be an even number, because the arrangement for leading out the line sections of the second control electrode 32 and the rearrangement of the control signals according to the order of recording become very complicated in a case of grouping an off number of ion passing holes 29 together.

It is also to be noted that although the shape of each ion passing hole 29 is selected to be circular in this embodiment, this shape of the ion passing hole 29 may be changed to other shapes. For example, the shape of the ion passing hole 29 may be modified into an elliptical shape with the major axis along the main scanning direction or a rectangular shape with longer sides along the main scanning direction.

Referring now to FIGS. 36 to 39, the modified embodiments for the ion generation device configuration of FIG. 16 described above will be described.

Figure 36:
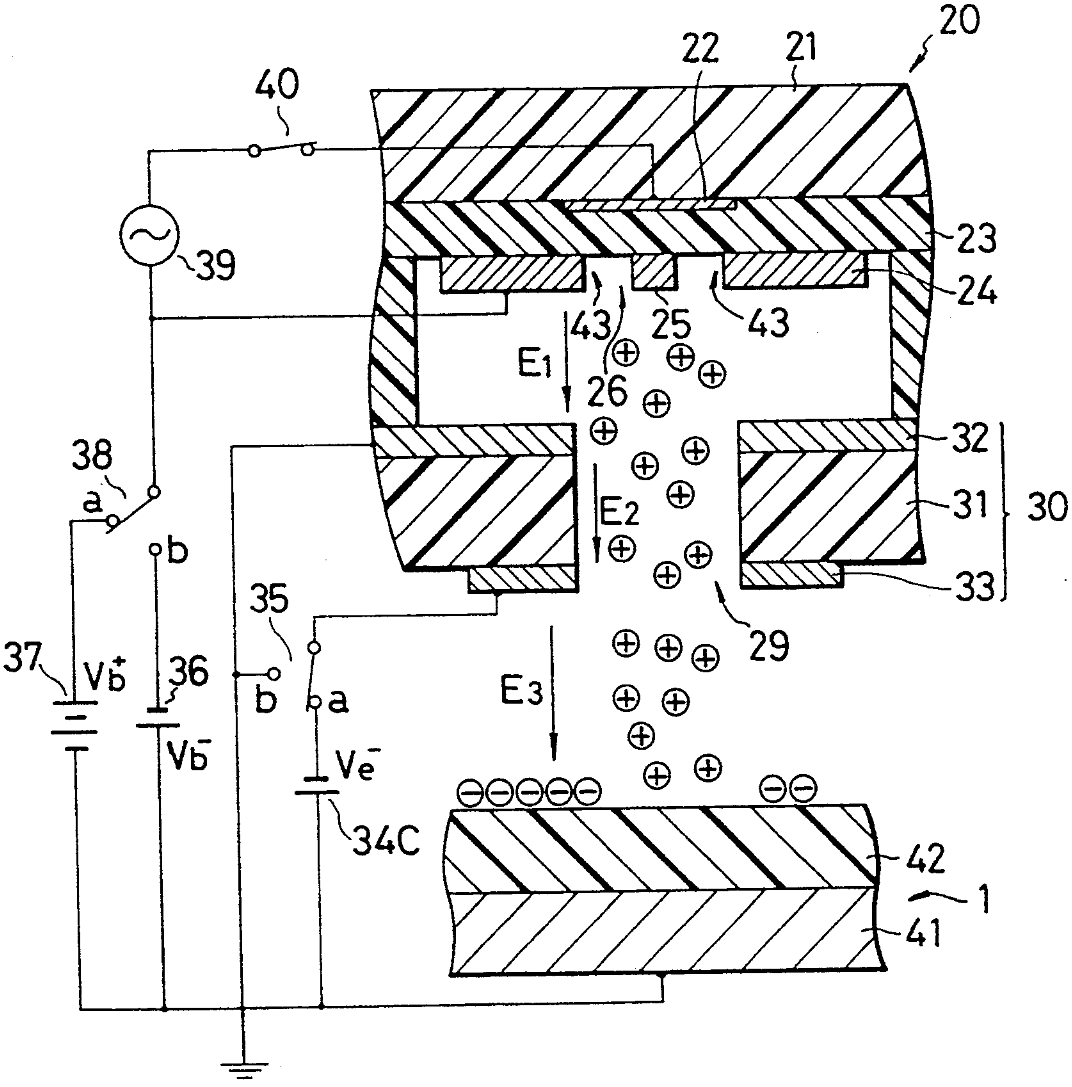
FIG. 36 is a cross sectional view of one modified embodiment of an ion generation device of FIG. 16 in the solid ion recording head of FIG. 14.

FIG. 36 shows the first modified embodiment of the ion generation device configuration. In this modified configuration of FIG. 36, the application of the control voltage to the first and second control electrodes 32 and 33 is modified such that the first control electrode 32 is constantly maintained at the ground voltage level, whereas the second control electrode 33 is maintained at a negative voltage level Ve− by a negative voltage source 34C at a time of recording operation by connecting a switch 35 to a terminal a, and at the ground voltage level at a time of non-recording operation by connecting the switch 35 to a terminal b. The rest of the configuration of FIG. 36 is substantially equivalent to that of FIG. 16.

It is obvious that with this modified configuration of FIG. 36, the electric fields $E_1$, $E_2$, and $E_3$ can be formed just as in the configuration of FIG. 16, so that the similar control of the positively charged ions can be achieved.

Figure 37:
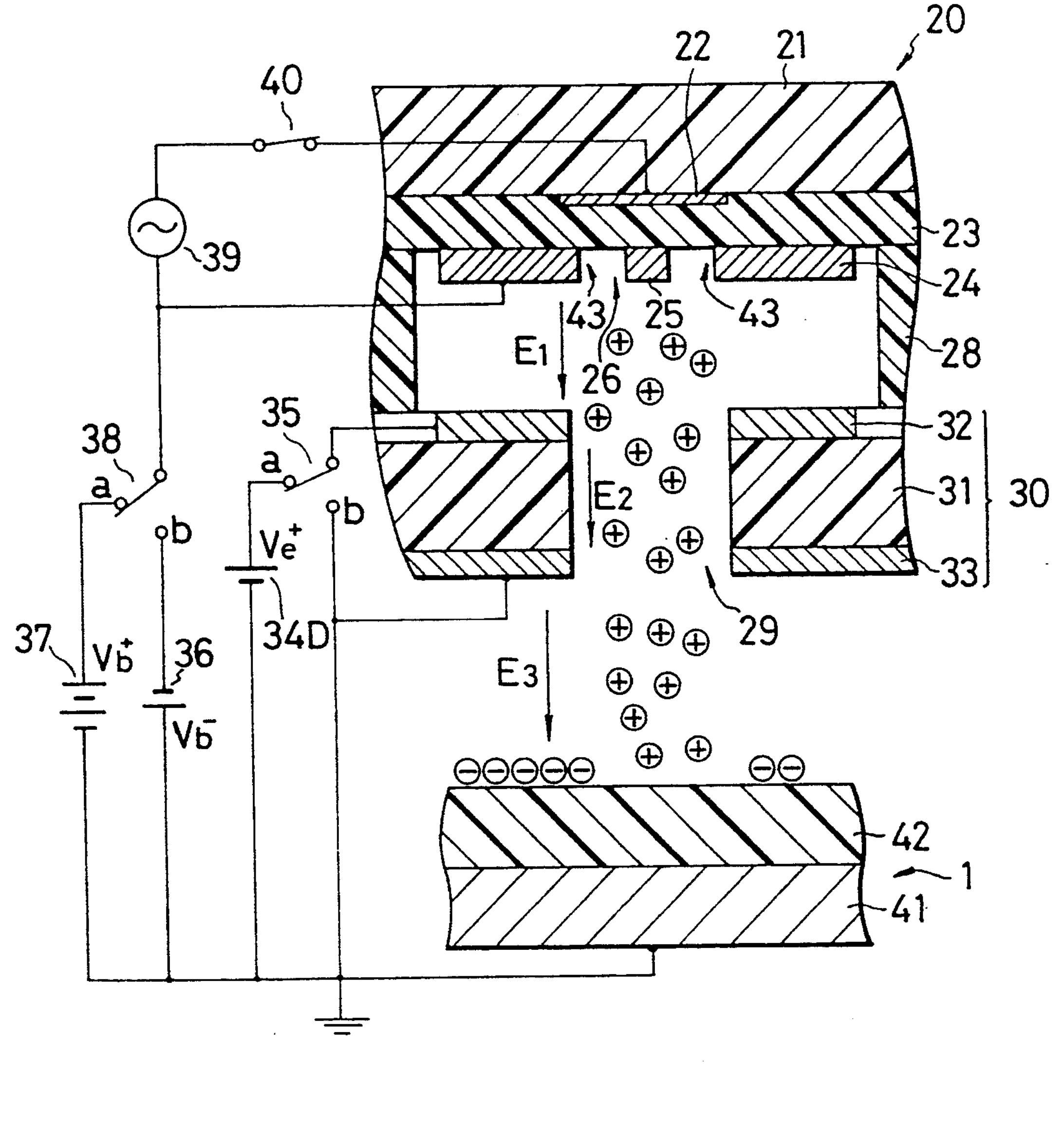
FIG. 37 is a cross sectional view of another modified embodiment of an ion generation device of FIG. 16 in the solid ion recording head of FIG. 14.

FIG. 37 shows the second modified embodiment of the ion generation device configuration. In this modified configuration of FIG. 37, the application of the control voltage to the first and second control electrodes 32 and 33 is modified such that the second control electrode 33 is constantly maintained at the ground voltage level, whereas the first control electrode 32 is maintained at a positive voltage level Ve− by a positive voltage source 34D at a time of recording operation by connecting a switch 35 to a terminal a, and at the ground voltage level at a time of non-recording operation by connecting the switch 35 to a terminal b. The rest of the configuration of FIG. 37 is substantially equivalent to that of FIG. 16.

It is obvious that with this modified configuration of FIG. 37, the electric fields $E_1$, $E_2$, and $E_3$ can be formed just as in the configuration of FIG. 16, so that the similar control of the positively charged ions can be achieved.

It is noted here that in this case of FIG. 37, the roles of the first and second control electrodes 32 and 33 are exchanged from those in the configuration of FIG. 16, so that the first control electrode 32 has the minutely patterned appearance such as that shown in FIG. 31 while the second control electrode 33 is commonly provided for all the ion passing holes and has the simple appearance such as that shown in FIG. 30.

Figure 38:
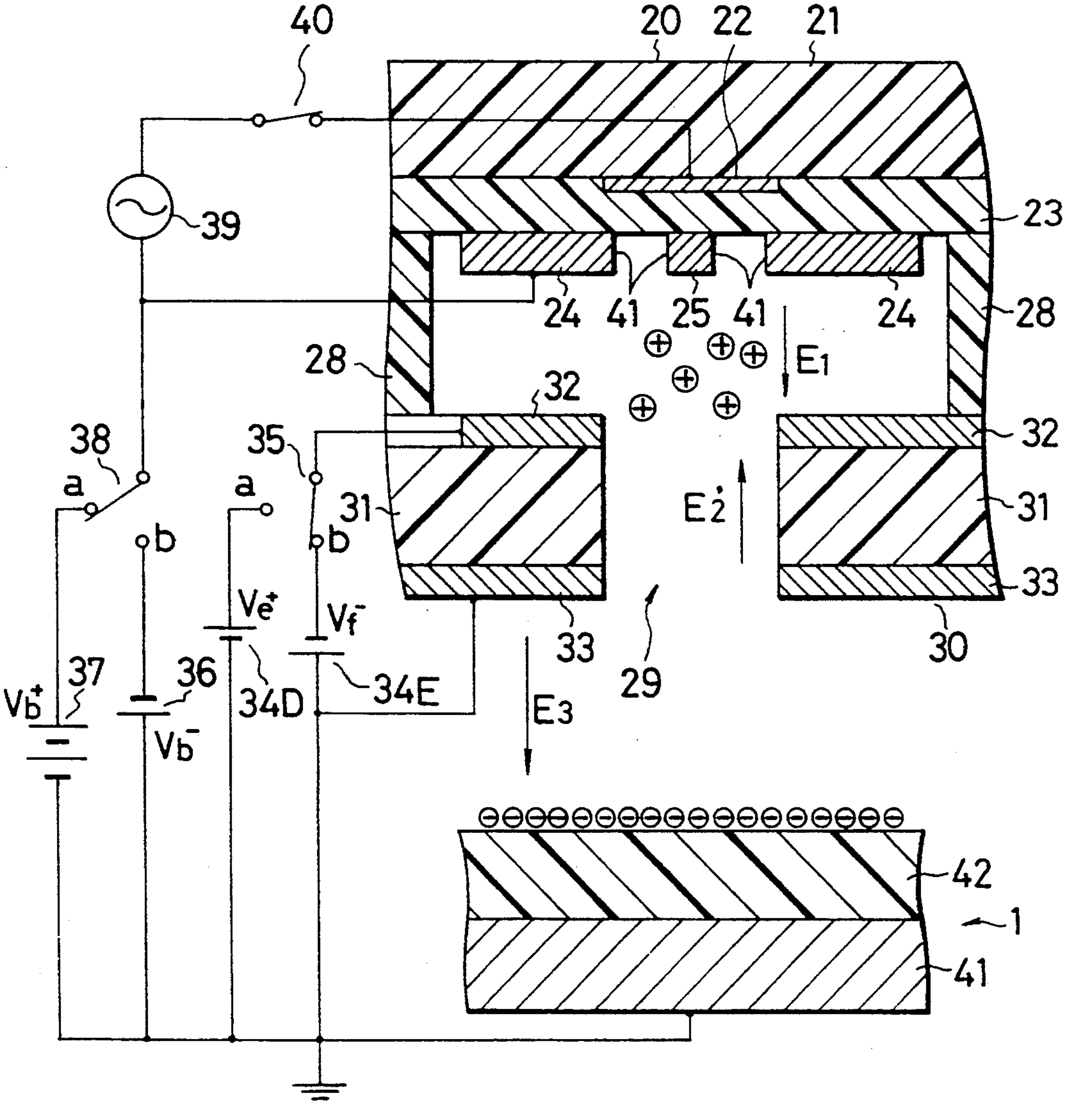
FIG. 38 is a cross sectional view of another modified embodiment of an ion generation device of FIG. 16 in the solid ion recording head of FIG. 14.

FIG. 38 shows the third modified embodiment of the ion generation device configuration. In this modified configuration of FIG. 38, the application of the control voltage to the first and second control electrodes 32 and 33 is modified such that the second control electrode 33 is constantly maintained at the ground voltage level, whereas the first control electrode 32 is maintained at a positive voltage level Ve+ by a positive voltage source 34D at a time of recording operation by connecting a switch 35 to a terminal a, and at a negative voltage level Vf− by a negative voltage source 34E at a time of non-recording operation by connecting the switch 35 to a terminal b. The rest of the configuration of FIG. 38 is substantially equivalent to that of FIG. 16.

It is obvious that with this modified configuration of FIG. 38, the electric fields $E_1$, $E_2$, and $E_3$ can be formed just as in the configuration of FIG. 16, so that the similar control of the positively charged ions can be achieved.

In this embodiment, at a time of non-recording operation, the electric field $E_2'$ in direction to prevent the motion of the positively charged ions toward the recording drum 1 is produced by the negative voltage Vf− as shown in FIG. 38, so that it is highly effective in preventing the leakage of the positively charged ions through the ion passing holes 29 at time of non-recording operation.

It is noted here that in this case of FIG. 38 also, the roles of the first and second control electrodes 32 and 33 are exchanged from those in the configuration of FIG. 13, so that the first control electrode 32 has the minutely patterned appearance such as that shown in FIG. 31 while the second control electrode 33 is commonly provided for all the ion passing holes and has the simple appearance such as that shown in FIG. 30.

Figure 39:
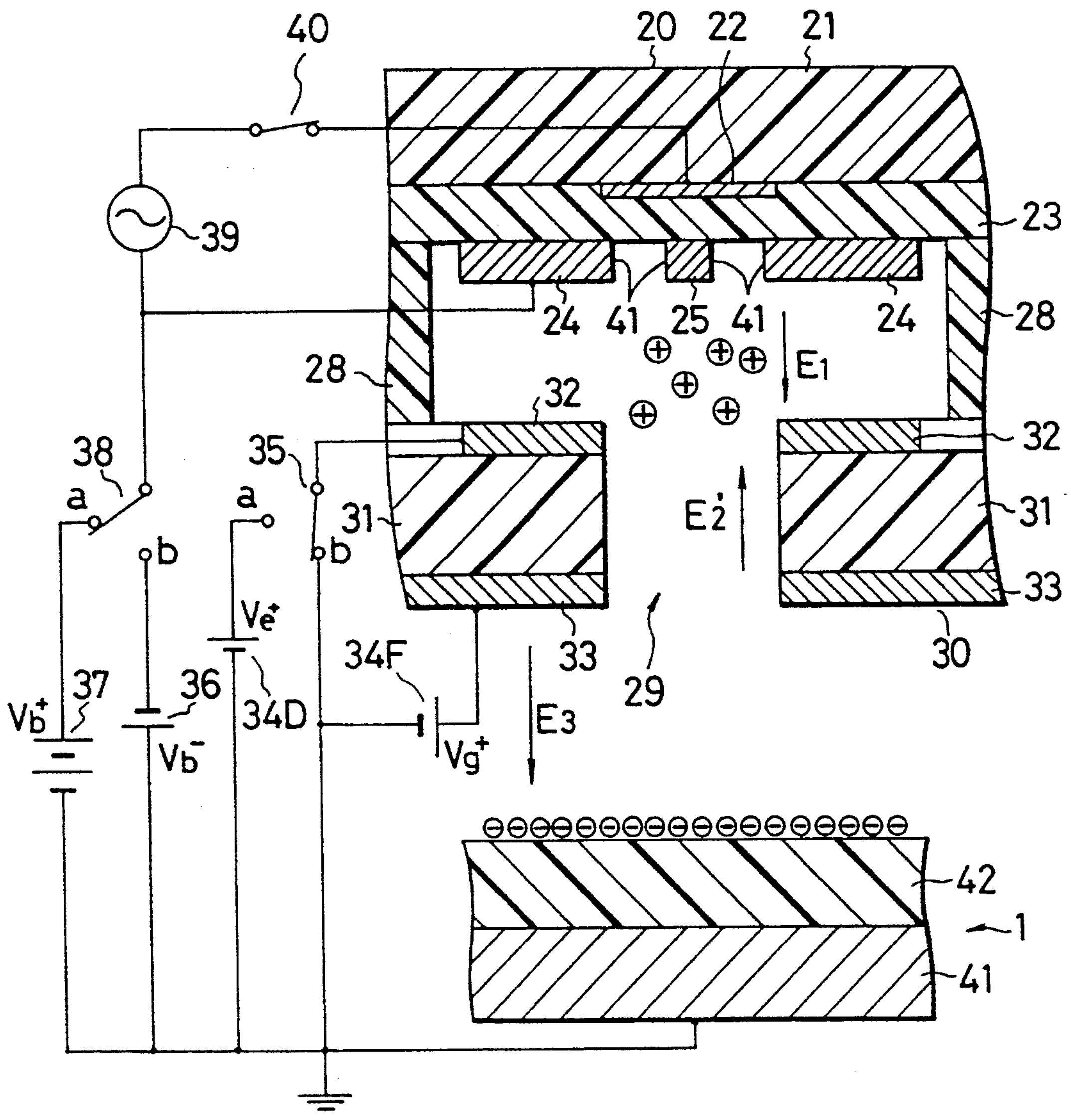
FIG. 39 is a cross sectional view of another modified embodiment of an ion generation device of FIG. 16 in the solid ion recording head of FIG. 14.

FIG. 39 shows the fourth modified embodiment of the ion generation device configuration. In this modified configuration of FIG. 39, the application of the control voltage to the first and second control electrodes 32 and 33 is modified such that the second control electrode 33 is constantly maintained at a positive voltage level Vg+ by a positive voltage source 34F, whereas the first control electrode 32 is maintained at a positive voltage level Ve+ by a positive voltage source 34D at a time of recording operation by connecting a switch 35 to a terminal a, and at the ground voltage level at a time of non-recording operation by connecting the switch 35 to a terminal b. The rest of the configuration of FIG. 39 is substantially equivalent to that of FIG. 16.

It is obvious that with this modified configuration of FIG. 39, the electric fields $E_1$, $E_2$, and $E_3$ can be formed Just as in the configuration of FIG. 16, so that the similar control of the positively charged ions can be achieved.

In this embodiment also, at a time of non-recording operation, the electric field $E_2'$ in direction to prevent the motion of the positively charged ions toward the recording drum 1 is produced by the positive voltage Vg+ as shown in FIG. 39, so that it is highly effective in preventing the leakage of the positively charged ions through the ion passing holes 29 at at time of non-recording operation.

It is noted here that in this case of FIG. 39 also, the roles of the first and second control electrodes 32 and 33 are exchanged from those in the configuration of FIG. 16, so that the first control electrode 32 has the minutely patterned appearance such as that shown in FIG. 31 while the second control electrode 33 is commonly provided for all the ion passing holes and has the simple appearance such as that shown in FIG. 30.

Figure 41:
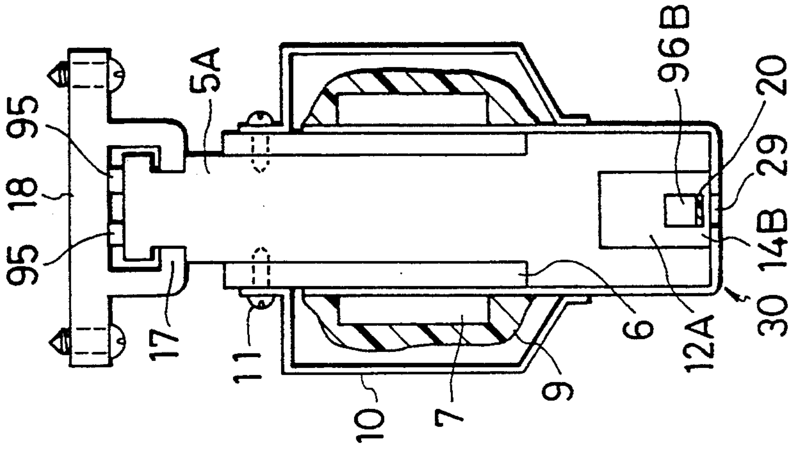
FIG. 41 is a longitudinal cross sectional view of an overall configuration of another modified embodiment of a solid ion recording head of FIG. 14.
Figure 40:
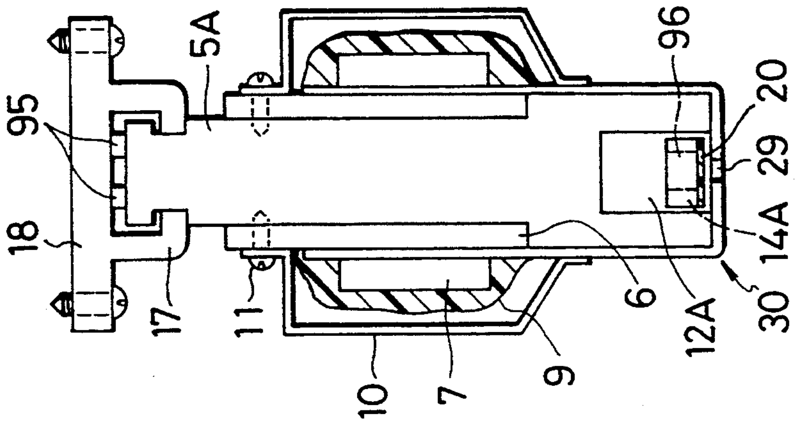
FIG. 40 is a longitudinal cross sectional view of an overall configuration of one modified embodiment of a solid ion recording head of FIG. 14.

Referring now to FIGS. 40 and 41, the modified embodiments for the overall configuration of the solid ion recording head of FIG. 14 described above will be described.

FIG. 40 shows the first modified embodiment of the overall configuration of the solid ion recording head. This modified embodiment of FIG. 40 differs from the configuration of FIG. 14 in that the head support member 5A has a completely rectangular cross sectional shape, and that the air supply port 12A also has a rectangular cross sectional shape which is more suitable for a larger size solid ion recording head. Also, in this modified configuration of FIG. 40, the ion generator 20 is mounted on an ion generator support member 96 in which the air supply passages 14A are formed beforehand, such that the exchange of the ion generator 20 can be achieved by taking the ion generator support member 96 out of the air supply port 12A. In addition, the modified configuration of FIG. 40 has plate spring members 95 between the slide rails 18 and the head support member 5A such that the head support member 5A is pressed down in order to maintain the constant orientation and distance of the solid ion recording head with respect to the recording drum.

FIG. 41 shows the second modified embodiment of the overall configuration of the solid ion recording head. This modified embodiment of FIG. 41 differs from that of FIG. 40 in that the ion generator support member 96B has a width smaller than that of the rectangular shaped air supply port 12A, such that the air supply passages 14B are provided as the clearances formed between the air supply port 1A and the ton generator support member 14B.

Referring now to FIG. 42, the modified embodiment for the ion passing hole 29 in the solid ion recording head according to the present invention described above will be described.

In the embodiments described so far, the ion passing holes 29 are provided in correspondence to the picture dots to be recorded, so that there is one ion passing hole 29 for one picture dot.

In contrast, in the modified configuration shown in FIG. 42, a plurality of smaller ion passing holes 29' (37 holes in FIG. 42) piercing through the entire control substrate 30 including the first and second control electrodes 32 and 33 and the insulative substrate 31 are provided for one picture dot.

Such a configuration of providing a plurality of smaller ion passing holes 29' for one picture dot has an advantage that the deterioration of the recorded image quality due to the clogging of the ion passing holes by the scattered toner can be suppressed because it is highly unlikely for all of the smaller ion passing holes 29' for one picture dot to be clogged altogether.

The size of each one of the smaller ion passing holes 29' can be approximately 10 μm in diameter for the picture dot of approximately 100 μm in diameter, for example. In such a case, the thickness of the insulative substrate 31 should preferably be approximately 10 μm, because the control of the ions can be performed more efficiently when the diameter of the smaller ion passing hole 29' and the thickness of the insulative substrate 31 are substantially equal to each other. The control substrate 30 with such smaller ion passing holes 29' can be manufactured by using the etching process.

It is to be noted that besides those already mentioned, many modifications and variations of the above embodiments may be made without departing from the novel and advantageous features of the present invention. Accordingly, all such modifications and variations are intended to be included within the scope of the appended claims.

What is claimed is:

1. An apparatus for generating ions, comprising:

ion generator means for generating ions; and control electrode means having ion passing holes for controlling a motion of the ions from the ion generator means to the recording medium through the ion passing holes, the ion passing holes being arranged such that each of second and subsequent picture dots to be recorded on the recording medium from each one of the ion passing holes is recorded on a spot around which picture dots already recorded by other ion passing holes are distributed symmetrically on both sides at a time of recording.

2. The apparatus of claim 1, wherein the ion passing holes are divided into a plurality of groups, each group containing a selected number of ion passing holes arranged in a sub-scanning direction of the ton generation device, and the groups of the ion passing holes are arranged in a main scanning direction of the ion generation device.

3. The apparatus of claim 2, wherein all the ion passing holes are arranged at a constant pitch between each adjacent ones in the main scanning direction while the selected number of ion passing holes forming each group are arranged on the selected number of lines along the main scanning direction which are arranged at another constant pitch in the sub-scanning direction.

4. The apparatus of claim 2, wherein the selected number of ion passing holes forming each group is an even number.

5. The apparatus of claim 2, wherein the ion generator means includes the selected number of ion generation sections arranged in the sub-scanning direction of the ion recording head apparatus.

6. The apparatus of claim 5, wherein the control electrode means includes means for indicating proper positioning of the control electrode means with respect to the ion generator means such that the selected number of ion passing holes arranged in the sub-scanning direction are accurately aligned with the selected number of ion generation sections of the ion generator means.

* * * * *